(12) United States Patent
Dou et al.

(10) Patent No.: US 12,136,968 B2
(45) Date of Patent: Nov. 5, 2024

(54) POSITIONING METHOD, DEVICE AND SYSTEM FOR TRANSMITTING DEVICE, AND STORAGE MEDIUM AND ELECTRONIC DEVICE

(71) Applicant: ZTE Corporation, Shenzhen (CN)

(72) Inventors: Jianwu Dou, Shenzhen (CN); Min Fang, Shenzhen (CN); Yijian Chen, Shenzhen (CN); Nan Zhang, Shenzhen (CN); Lin Peng, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 124 days.

(21) Appl. No.: 18/012,313

(22) PCT Filed: May 12, 2021

(86) PCT No.: PCT/CN2021/093459
§ 371 (c)(1),
(2) Date: Dec. 22, 2022

(87) PCT Pub. No.: WO2022/001402
PCT Pub. Date: Jan. 6, 2022

(65) Prior Publication Data
US 2023/0268961 A1 Aug. 24, 2023

(30) Foreign Application Priority Data

Jun. 30, 2020 (CN) .......................... 202010615392.8

(51) Int. Cl.
*H04B 7/04* (2017.01)
*H01Q 15/00* (2006.01)
(52) U.S. Cl.
CPC ..... *H04B 7/04013* (2023.05); *H01Q 15/0093* (2013.01)

(58) Field of Classification Search
None
See application file for complete search history.

(56) References Cited

U.S. PATENT DOCUMENTS 6,741,358 B1 * 5/2004 Kamiya .............. G03F 7/70483
356/500
8,649,742 B2 * 2/2014 Maruyama ............. H01Q 15/08
455/106

(Continued)

FOREIGN PATENT DOCUMENTS

| CN | 111131096 A | 5/2020 |
| CN | 210516995 U | 5/2020 |
| CN | 111867054 A | 10/2020 |

OTHER PUBLICATIONS

International Search Report for PCT/CN2021/093459 filed May 12, 2021; Mail date Aug. 10, 2021.

*Primary Examiner* — Wilson Lee
(74) *Attorney, Agent, or Firm* — CANTOR COLBURN LLP

(57) ABSTRACT

Provided are a positioning method, device and system for a transmitting device, and a storage medium and an electronic device. The method includes that: control information is determined by a receiving device, wherein the control information includes temporal information and control direction information, and the control direction information is used for instructing a meta-surface control unit to adjust a reflection coefficient of a meta-surface to a target reflection coefficient corresponding to a preset direction within a target time period; a pilot signal is transmitted to the meta-surface by a transmitting device; the control information is sent to the meta-surface control unit by the receiving device; and a signal measurement result corresponding to the preset direc- (Continued)

tion is determined, and the transmitting device is positioned according to the preset direction and the signal measurement result.

20 Claims, 13 Drawing Sheets

(56) References Cited

U.S. PATENT DOCUMENTS

| | | | |
|---|---|---|---|
| 10,914,829 B2* | 2/2021 | Nakayama | G01S 5/0273 |
| 2012/0257190 A1* | 10/2012 | Nakanishi | G01S 17/875 |
| | | | 356/615 |
| 2017/0184699 A1* | 6/2017 | Honma | G01S 13/003 |
| 2019/0092360 A1 | 3/2019 | Green | |
| 2020/0137698 A1 | 4/2020 | Black | |
| 2021/0025981 A1* | 1/2021 | Kato | G01S 7/4808 |

* cited by examiner

Fig. 3

Determine control information by a receiving device, wherein the control information includes temporal information and control direction information, the control direction information is used for instructing a meta-surface control unit to adjust a reflection coefficient of a meta-surface to a target reflection coefficient corresponding to a preset direction, so that a beam in a direction from the receiving device to the meta-surface forms on the meta-surface a reflected beam in the preset direction, the preset direction is a direction indicated by preset direction information corresponding to a target time period, and the preset direction points to a target area, the temporal information includes the target time period, and the control direction information includes the preset direction information ⟋ S302

Transmit a pilot signal to the meta-surface by a transmitting device, wherein the transmitting device is located in the target area ⟋ S304

Send the control information to the meta-surface control unit by the receiving device, wherein the control information is used for instructing the meta-surface control unit to adjust the reflection coefficient of the meta-surface to the target reflection coefficient corresponding to the preset direction within the target time period ⟋ S306

Determine a signal measurement result corresponding to the preset direction, and position the transmitting device according to the preset direction and the signal measurement result, wherein the signal measurement result is a measurement result obtained by the receiving device measuring a received target pilot signal, the target pilot signal is received by the receiving device after reflected by the meta-surface whose reflection coefficient is adjusted to the target reflection coefficient, and the pilot signals transmitted by the transmitting device include the target pilot signal ⟋ S308

Y-coordinate y of the target area (in meters)

POSITIONING METHOD, DEVICE AND SYSTEM FOR TRANSMITTING DEVICE, AND STORAGE MEDIUM AND ELECTRONIC DEVICE

CROSS REFERENCE

This application is a National Stage Filing of the PCT International Application No. PCT/CN2021/093459 filed on May 12, 2021, which claims priority to Chinese patent application No. 202010615392.8 filed on Jun. 30, 2020, the entirety of which is herein incorporated by reference.

TECHNICAL FIELD

Embodiments of the present disclosure relate to the field of communications, in particular to a positioning method, device and system for a transmitting device, and a storage medium and an electronic device.

BACKGROUND

Traditional estimation methods for Direction of Arrival (DOA) of an array beam include Multiple Signal Classification (MUSIC), Estimating Signal parameter via Rotation Invariance Techniques (ESPRIT), etc., a foundation of which lies in an independent measurement function (for example, an arrival phase measurement function) of an array element. However, for a beam-adjustable meta-surface (also called meta-surface or reconfigurable meta-surface), the addition of such a measuring function will reduce reflection efficiency and increase cost. Therefore, the meta-surface is not usually associated with a phase measuring function of an independent electromagnetic unit, which makes the traditional estimation methods for DOA of the array not available in the meta-surface.

Traditional Non-Line-Of-Sight (NLOS) positioning methods include a Line-Of-Sight (LOS) reconstruction positioning method, an NLOS weighted positioning method, a Time of Arrival (TOA) positioning method based on a combination of line-of-sight reconstruction and smoothing, and a positioning method based on inequality constraints. In these methods, the NLOS is converted into the LOS according to a mirror principle, or influences of NLOS components are reduced through stochastic methods by the coordination between multiple base stations. Moreover, fingerprint maps or positioning methods based on a Global Positioning System (GPS) in the related art require the deployment of another positioning system and related accessories, which increases the cost and limits the implementation in some scenarios. It can be seen that in the related art, the use of multiple systems and the support from other related technologies are required during positioning, and a terminal cannot be positioned by means of the characteristics of a meta-surface.

For the technical problem in the related art that a terminal cannot be positioned by means of characteristics of a meta-surface, no effective technical solution is available so far.

SUMMARY

The embodiments of the present disclosure provide a positioning method, device and system for a transmitting device, and a storage medium and an electronic device, which can at least the technical problem in the related art that a terminal cannot be positioned by means of characteristics of a meta-surface.

According to an embodiment of the present disclosure, a positioning method for a transmitting device is provided, which includes the following operations. Control information is determined by a receiving device, wherein the control information includes temporal information and control direction information: the control direction information is used for instructing a meta-surface control unit to adjust a reflection coefficient of a meta-surface to a target reflection coefficient corresponding to a preset direction, so that a beam in a direction from the receiving device to the meta-surface forms on the meta-surface a reflected beam in the preset direction: the preset direction is a direction indicated by preset direction information corresponding to a target time period, and the preset direction points to a target area: the temporal information includes the target time period; and the control direction information includes the preset direction information. A pilot signal is transmitted to the meta-surface by a transmitting device, wherein the transmitting device is located in the target area. The control information is sent to the meta-surface control unit by the receiving device, wherein the control information is used for instructing the meta-surface control unit to adjust the reflection coefficient of the meta-surface to the target reflection coefficient corresponding to the preset direction within the target time period. A signal measurement result corresponding to the preset direction is determined, and the transmitting device is positioned according to the preset direction and the signal measurement result, wherein the signal measurement result is a measurement result obtained by the receiving device measuring a received target pilot signal: the target pilot signal is received by the receiving device after reflected by the meta-surface whose reflection coefficient is adjusted to the target reflection coefficient; and the pilot signals transmitted by the transmitting device include the target pilot signal.

According to another embodiment of the present disclosure, a positioning device for a transmitting device is provided, which includes: a determining module, a transmitting module, a controlling module and a positioning module. The determining module is configured to determine the control information by the receiving device. The control information includes the temporal information and the control direction information. The control direction information is used for instructing the meta-surface control unit to adjust the reflection coefficient of the meta-surface to the target reflection coefficient corresponding to the preset direction, so that the beam in the direction from the receiving device to the meta-surface forms on the meta-surface the reflected beam in the preset direction. The preset direction is a direction indicated by preset direction information corresponding to a target time period, and the preset direction points to the target area. The temporal information includes the target time period. The control direction information includes the preset direction information. The transmitting module is configured to transmit the pilot signal to the meta-surface by the transmitting device. The transmitting device is located in the target area. The controlling module is configured to send the control information to the meta-surface control unit by the receiving device. The control information is used for instructing the meta-surface control unit to adjust the reflection coefficient of the meta-surface to the target reflection coefficient corresponding to the preset direction within the target time period. The positioning module is configured to determine the signal measurement result corresponding to the preset direction, and position the transmitting device according to the preset direction and the signal measurement result. The signal measurement result is a measurement result obtained by the receiving device measuring a received target pilot signal. The target pilot signal is received by the receiving device after reflected by the meta-surface whose reflection coefficient is adjusted to the target reflection coefficient. The pilot signals transmitted by the transmitting device include the target pilot signal.

According to yet another embodiment of the present disclosure, a positioning system for a transmitting device is provided, which includes: a transmitting device, a receiving device, a meta-surface control unit, a meta-surface and a positioning node. The receiving device is configured to determine the control information. The control information includes the temporal information and the control direction information. The control direction information is used for instructing the meta-surface control unit to adjust the reflection coefficient of the meta-surface to the target reflection coefficient corresponding to the preset direction, so that the beam in the direction from the receiving device to the meta-surface forms on the meta-surface the reflected beam in the preset direction. The preset direction is a direction indicated by preset direction information corresponding to a target time period, and the preset direction points to the target area. The temporal information includes the target time period. The control direction information includes the preset direction information. The transmitting device is configured to transmit the pilot signal to the meta-surface. The transmitting device is located in the target area. The receiving device is further configured to send the control information to the meta-surface control unit. The control information is used for instructing the meta-surface control unit to adjust the reflection coefficient of the meta-surface to the target reflection coefficient corresponding to the preset direction within the target time period. The receiving device is further configured to determine the signal measurement result corresponding to the preset direction. The positioning node is configured to position the transmitting device according to the preset direction and the signal measurement result. The signal measurement result is a measurement result obtained by the receiving device measuring a received target pilot signal. The target pilot signal is received by the receiving device after reflected by the meta-surface whose reflection coefficient is adjusted to the target reflection coefficient. The pilot signals transmitted by the transmitting device include the target pilot signal.

According to yet another embodiment of the present disclosure, a computer-readable storage medium is also provided, in which a computer program is stored. The computer program is configured to execute, when running, the operations in any above method embodiment.

According to yet another embodiment of the present disclosure, an electronic device is also provided, which includes a memory and a processor. The memory stores a computer program. The processor is configured to run the computer program, so as to perform operations in any of the above method embodiments.

BRIEF DESCRIPTION OF THE DRAWINGS

FIG. 3 is a flowchart of a positioning method for a transmitting device according to an embodiment of the present disclosure.

DETAILED DESCRIPTION

Embodiments of the present disclosure will be described in detail below with reference to the accompanying drawings in conjunction with the embodiments.

It should be noted that the terms "first", "second", etc., in the description and claims of the present disclosure and in the above accompanying drawings, are used to distinguish between similar objects and not necessarily to describe a particular order or sequential order.

Figure 1:
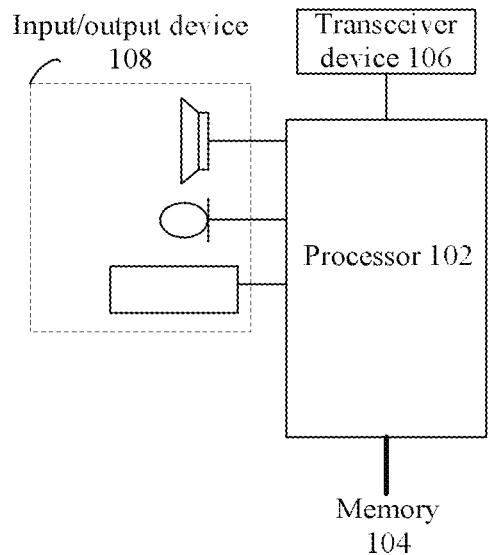
FIG. 1 is a structural block diagram of hardware of an electronic device in a positioning method for a transmitting device according to an embodiment of the present disclosure.

A method embodiment provided in an embodiment of the present disclosure may be executed in a mobile terminal, a computer terminal or a similar computing device. Taking the method embodiment running on an electronic device as an example. FIG. 1 is a structural block diagram of hardware of an electronic device for a positioning method for a transmitting device in an embodiment of the present disclosure. As shown in FIG. 1, the electronic device may include one or more (only one is shown in FIG. 1) processors 102 (the processor 102 may include, but is not limited to, a micro controller unit (MCU) or a field programmable gate array (FPGA) and other processing devices) and a memory 104 configured to store data. The above electronic device may further include a transceiver device 106 with a communication function and an input/output device 108. Those having ordinary skill in the art can understand that a structure shown in FIG. 1 is merely schematic and does not pose a limitation on a structure of the above electronic device. For example, the electronic device may further include assemblies more or fewer than those shown in FIG. 1, or have a configuration different from that shown in FIG. 1.

The memory 104 may be configured to store a computer program such as a software program and module of an application, for example, a computer program corresponding to a positioning method for a transmitting device in an embodiment of the present disclosure, and the processor 102 executes various functional applications and data processing by running the computer program stored in the memory 104, that is, achieves the above method. The memory 104 may include a high-speed random access memory, and may further include a non-volatile memory, for example, one or more magnetic storage devices, flash memories, or other non-volatile solid-state memories. In some examples, the memory 104 may further include a memory remotely arranged with respect to the processor 102, and the remote memory may be connected with the electronic device by means of a network. Examples of the above network include, but are not limited to, the internet, enterprise intranets, local area networks, mobile communication networks, and combinations thereof.

The transceiver device 106 is configured to receive or transmit data by means of a network. Specific examples of the above network may include a wireless network provided by a communication provider. In one example, the transceiver device 106 includes a network interface controller (NIC), which may be connected with other network devices so as to be in communication with the internet. In one example, the transceiver device 106 may be a radio frequency (RF) module, which is configured to be in communication with the internet in a wireless manner.

Figure 2:
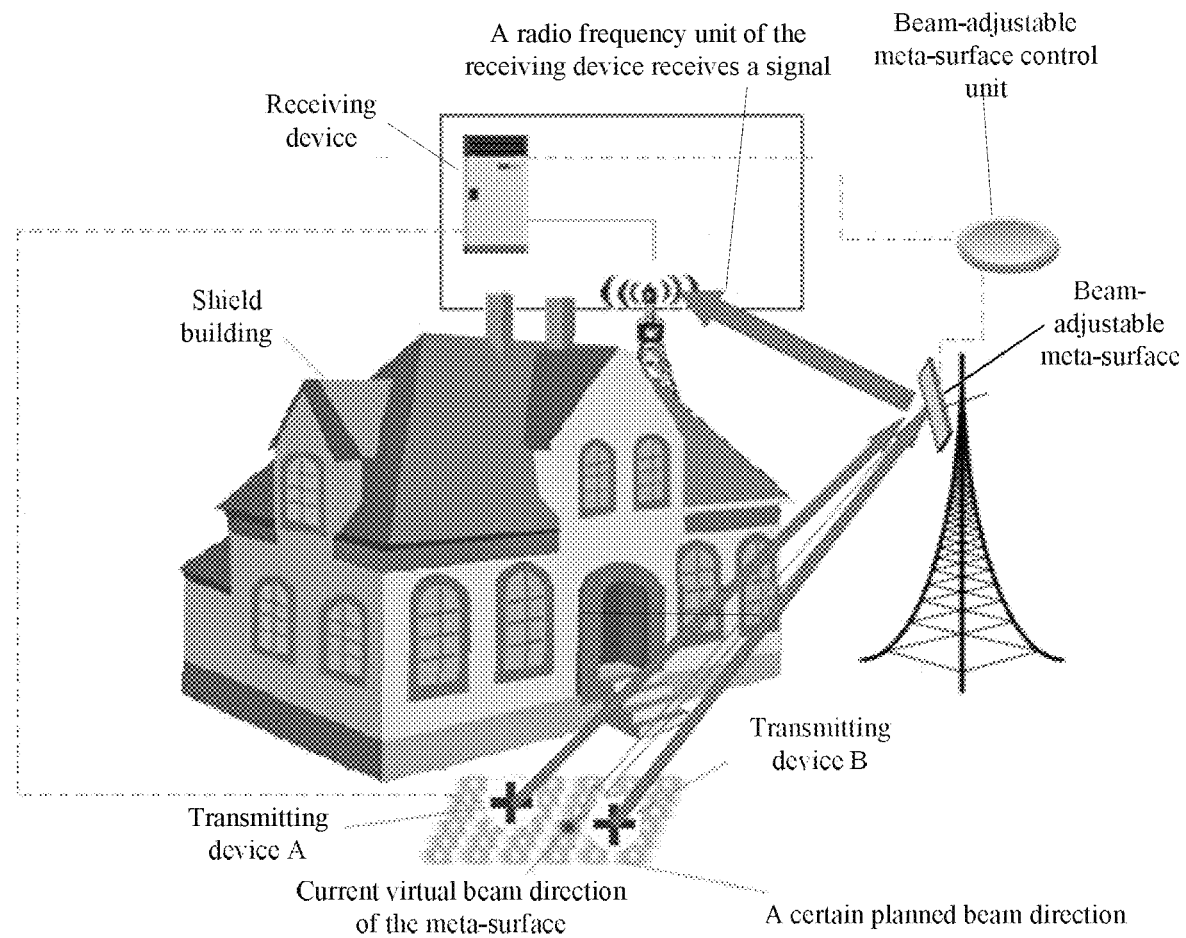
FIG. 2 is a network architecture diagram of a positioning method for a transmitting device according to an embodiment of the present disclosure.

The embodiments of the present disclosure may run on the network architecture shown in FIG. 2. As shown in FIG. 2, the network architecture includes: a transmitting device (for example, a terminal. FIG. 2 shows that there are two transmitting devices, namely transmitting device A (i.e. terminal A) and transmitting device B (i.e. terminal B)), a beam-adjustable meta-surface control unit (i.e. corresponding to the meta-surface control unit in the embodiments of the present disclosure, or called meta-surface control device or meta-surface control apparatus), a beam-adjustable meta-surface (i.e. the meta-surface in the embodiments of the present disclosure, also called reconfigurable meta-surface), and a receiving device (for example, a base station). The receiving device includes a radio frequency unit or antenna. The receiving device is configured to plan, configure, and receive a specific radio signal. For example, the receiving device receives the specific radio signal transmitted by the transmitting device and reflected by the meta-surface (i.e. a target pilot signal in the embodiments of the present disclosure). The meta-surface control unit is configured to control a reflection coefficient of each electromagnetic unit (or called electromagnetic reflection unit) in the meta-surface. The meta-surface is composed of several groups of electromagnetic units with controllable reflection coefficient. By controlling the reflection coefficient of each electromagnetic element, the meta-surface can form a predetermined reflected beam antenna pattern (that is, a reflected beam in a preset direction is formed on the meta-surface). The transmitting device is configured to transmit a specific radio signal (i.e. the target pilot signal). The receiving device is further configured to measure, record or analyze the received target pilot signal. The target pilot signal transmitted by the transmitting device is planned and configured in advance by the receiving device (for example, a base station). The target pilot signals corresponding to different transmitting devices are different, that is, after receiving the target pilot signal, the receiving device may distinguish different transmitting devices according to the target pilot signal.

In the present embodiment, a positioning method for a transmitting device running in the above network architecture is provided. FIG. 3 is a flowchart of a positioning method for a transmitting device according to an embodiment of the present disclosure. As shown in FIG. 3, the flow includes the following operations.

At S302, control information is determined by a receiving device. The control information includes temporal information and control direction information. The control direction information is used for instructing a meta-surface control unit to adjust a reflection coefficient of a meta-surface to a target reflection coefficient corresponding to a preset direction, so that a beam in a direction from the receiving device to the meta-surface forms on the meta-surface a reflected beam in the preset direction. The preset direction is a direction indicated by preset direction information corresponding to a target time period, and the preset direction points to a target area. The temporal information includes the target time period. The control direction information includes the preset direction information.

At S304, a pilot signal is transmitted to the meta-surface by a transmitting device. The transmitting device is located in the target area.

At S306, the control information is sent to the meta-surface control unit by the receiving device. The control information is used for instructing the meta-surface control unit to adjust the reflection coefficient of the meta-surface to the target reflection coefficient corresponding to the preset direction within the target time period.

At S308, a signal measurement result corresponding to the preset direction is determined, and the transmitting device is positioned according to the preset direction and the signal measurement result. The signal measurement result is a measurement result obtained by the receiving device measuring a received target pilot signal. The target pilot signal is received by the receiving device after reflected by the meta-surface whose reflection coefficient is adjusted to the target reflection coefficient. The pilot signals transmitted by the transmitting device include the target pilot signal.

Through the above operations, control information is determined by a receiving device, wherein the control information includes temporal information and control direction information; the control direction information is used for instructing a meta-surface control unit to adjust a reflection coefficient of a meta-surface to a target reflection coefficient corresponding to a preset direction, so that a beam in a direction from the receiving device to the meta-surface forms on the meta-surface a reflected beam in the preset direction: the preset direction is a direction indicated by preset direction information corresponding to a target time period, and the preset direction points to a target area: the temporal information includes the target time period; and the control direction information includes the preset direction information. A pilot signal is transmitted to the meta-surface by a transmitting device, wherein the transmitting device is located in the target area. The control information is sent to the meta-surface control unit by the receiving device, wherein the control information is used for instructing the meta-surface control unit to adjust the reflection coefficient of the meta-surface to the target reflection coefficient corresponding to the preset direction within the target time period. A signal measurement result corresponding to the preset direction is determined, and the transmitting device is positioned according to the preset direction and the signal measurement result, wherein the signal measurement result is a measurement result obtained by the receiving device measuring a received target pilot signal: the target pilot signal is received by the receiving device after reflected by the meta-surface whose reflection coefficient is adjusted to the target reflection coefficient; and the pilot signals transmitted by the transmitting device include the target pilot signal. Therefore, the technical problem in the related art that a terminal cannot be positioned by means of characteristics of a meta-surface can be solved, thereby achieving the effect of using the characteristics of a meta-surface to position a terminal.

It is to be noted that in the embodiments of the present disclosure, positioning a transmitting device (i.e. a terminal) may be realized by using a system (namely using a base station and meta-surface) and the capability of the meta-surface, accordingly the positioning of the transmitting device can be completed by using a base station and the characteristics of the meta-surface.

In the above embodiment, the signal measurement result may be signal quality, signal strength level or signal received power.

The execution sequences of S304 and S306 are interchangeable, that is. S306 may be executed first and then S304.

In an exemplary embodiment, the operation that the control information is determined by the receiving device includes that the control information is determined according to a target area. The operation that the control information is determined according to the target area includes that: multiple pieces of preset direction information are determined according to multiple sub-areas obtained by dividing the target area, and multiple target time periods are determined according to the multiple pieces of preset direction information. The multiple pieces of preset direction information are in one-to-one correspondence with the multiple sub-areas. The temporal information includes the multiple target time periods. The multiple target time periods are in one-to-one correspondence with the multiple pieces of preset direction information. Alternatively, multiple preset directions pointing to the target area are determined, each piece of preset direction information among multiple pieces of preset direction information is determined as a respective one of the multiple preset directions, and the temporal information is determined according to the multiple pieces of preset direction information. The temporal information includes the multiple target time periods, and the multiple target time periods are in one-to-one correspondence with the multiple pieces of preset direction information.

In the above embodiment, the target area may be divided into multiple sub-areas by the receiving device. For example, the target area is divided into sub-area 1, sub-area 2, sub-area 3, etc., and the preset direction information corresponding to each sub-area is determined according to the multiple sub-areas, such as preset direction information 1, preset direction information 2, and preset direction information 3. The preset direction information is used for instructing the meta-surface control unit to adjust a reflection coefficient of each electromagnetic unit of the meta-surface, so that the reflected beam formed on the meta-surface points to the sub-area corresponding to the preset direction information. The reflected beam is the reflected beam (also called virtual reflected beam) formed on the meta-surface by the beam in the direction from the receiving device to the meta-surface. Therefore, by controlling the meta-surface to make the reflected beam point to the sub-areas of the target area in turn, the receiving device can scan the target area. In an exemplary embodiment, the receiving device may determine the preset direction information corresponding to each sub-area according to an order of scanning the sub-areas of the target area, and determine the temporal information according to the preset direction information determined (that is, determine multiple target time periods, each of which has the corresponding preset direction information). For example, if the multiple pieces of preset direction information determined are preset direction information 1, preset direction information 2, and preset direction information 3, then the temporal information includes target time period 1, target time period 2, and target time period 3 in chronological order. The target time period 1 corresponds to the preset direction information 1, the target time period 2 corresponds to the preset direction information 2, and the target time period 3 corresponds to the preset direction information 3.

In the above embodiment, the receiving device may directly determine multiple preset directions in the target area. For example, in the target area, the receiving device may determine a first preset direction pointing to a certain position in the target area, and determine a second preset direction pointing to another position in the target area, that is, determine multiple preset directions, and determine each piece preset direction information as a respective one of the multiple preset directions, that is, a preset direction may be taken as a piece of preset direction information. After determining multiple pieces of preset direction information, according to an order of scanning the positions of the target area, the receiving device may determine the target time period corresponding to the order of scanning. For example, the temporal information includes target time period 1 and target time period 2, the target time period 1 corresponding to the preset direction information 1, and the target time period 2 corresponding to the preset direction information 2.

It is to be noted that in the embodiments of the present disclosure, the target time period may be a time period corresponding to a time slot number (i.e. the serial number of a time slot), and the sequence information may be a set composed of the time periods corresponding to the time slot numbers (i.e. the time periods corresponding to the corresponding time slots), that is, the temporal information includes the time periods corresponding to multiple time slots in chronological order. Moreover, in the control information sent to the meta-surface control unit by the receiving device, the temporal information includes the multiple target time periods, the control direction information includes multiple pieces of preset direction information, and each target time period in the temporal information corresponds to each piece of preset direction information in the control direction information. Therefore, in the embodiments of the present disclosure, by sending the control information to the meta-surface control unit, the meta-surface control unit may be instructed to adjust the reflection coefficient of the meta-surface to the target reflection coefficient within a target time period; and when the next target time period of the target time period arrives (for example, the start time of the next target time period arrives), the reflection coefficient of the meta-surface is adjusted to the next target reflection coefficient by the meta-surface control unit. The next target reflection coefficient is the reflection coefficient corresponding to the next preset direction, and the next preset direction is the direction indicated by the preset direction information corresponding to the next target time period. Thus, the reflection coefficient of the meta-surface is adjusted to the corresponding reflection coefficient by the meta-surface control unit within a certain target time period in the temporal information. The corresponding reflection coefficient is the reflection coefficient corresponding to the preset direction indicated by the preset direction information corresponding to the target time period.

In an exemplary embodiment, after the control information is sent to the meta-surface control unit by the receiving device, the method may further include the following operations: the target reflection coefficient is determined by the meta-surface control unit according to the preset direction information; and a reflection coefficient of each electromagnetic unit of the meta-surface is adjusted to the target reflection coefficient by the meta-surface control unit within the target time period, so as to adjust the reflection coefficient of the meta-surface to the target reflection coefficient. The reflection coefficient of each electromagnetic unit includes at least one of amplitude, phase and polarization. That is, the reflection coefficient of each electromagnetic unit may be any combination of amplitude, phase and polarization.

In an exemplary embodiment, in a case where the preset direction information is an input parameter corresponding to the preset direction, after the control information is sent to the meta-surface control unit by the receiving device, the method may further include the following operations: the target reflection coefficient is determined by the meta-surface control unit according to the input parameter; and a reflection coefficient of each electromagnetic unit of the meta-surface is adjusted to the target reflection coefficient by the meta-surface control unit within the target time period, so as to adjust the reflection coefficient of the meta-surface to the target reflection coefficient: or, in a case where the preset direction information is the target reflection coefficient corresponding to the preset direction, after the control information is sent to the meta-surface control unit by the receiving device, the method may further include the following operation: a reflection coefficient of each electromagnetic unit of the meta-surface is adjusted to the target reflection coefficient by the meta-surface control unit within the target time period, so as to adjust the reflection coefficient of the meta-surface to the target reflection coefficient.

In an exemplary embodiment, the control information may further include at least one of following information: beam control start time for instructing the meta-surface control unit to start controlling a reflection coefficient of each electromagnetic unit of the meta-surface at the beam control start time; and beam control end time for instructing the meta-surface control unit to end up controlling the reflection coefficient of each electromagnetic unit of the meta-surface at the beam control end time.

The meta-surface control unit is further configured to adjust, at the beam control start time, the reflection coefficient of the meta-surface to the target reflection coefficient corresponding to the first preset direction according to the first target time period in the temporal information. The first preset direction is the direction indicated by the preset direction information corresponding to the first target time period.

In an exemplary embodiment, the target time periods in the temporal information form a continuous period of time, the start time of the first target time period in the temporal information is the beam control start time, the end time of the last target time period is the beam control end time, and the end time of each intermediate target time period (i.e. the target time period between the first target time period and the last target time period) is the start time of the next target time period. For example, the temporal information includes target time period 1 to target time period 3, the end time of the target time period 1 is the start time of the target time period 2, the end time of the target time period 2 is the start time of the target time period 3, the start time of the target time period 1 is the beam control start time, and the end time of the target time period 3 is the beam control end time.

In an exemplary embodiment, the temporal information may be a set of time periods corresponding to the time slots (for example, the time period corresponding to the first time slot to the time period corresponding to the 180th time slot, and the target time period is the time period corresponding to a target time slot number (also called target time slot or target time slot number, for example, one of the time slots from the first time slot to the 180th time slot). Moreover, the transmitting device records the target time period and the corresponding relationship of the pilot signals transmitted within the target time period, and when receiving the target pilot signals, the receiving device records the target time period and the corresponding relationship of the target pilot signals received within the target time period. It is to be noted that the target time period and the corresponding relationship of the pilot signals transmitted within the target time period which are recorded by the transmitting device are consistent with the target time period and the corresponding relationship of the target pilot signals received within the target time period which are recorded by the receiving device.

In an exemplary embodiment, the operation that the signal measurement result corresponding to the preset direction is determined may include the following operations: the target time period corresponding to each signal measurement result in a signal measurement result set is determined, wherein the signal measurement result set includes the signal measurement result corresponding to the preset direction; and according to the target time period, the preset direction indicated by the preset direction information corresponding to the target time period is determined, and the signal measurement result corresponding to the target time period is determined as the signal measurement result corresponding to the preset direction.

In the above embodiment, when receiving the target pilot signal, the receiving device records the target time period corresponding to the target pilot signal (for example, the time period corresponding to the first time slot), and measures the target pilot signal to obtain the signal measurement result. The signal measurement result may be signal quality, signal strength level or signal received power.

In an exemplary embodiment, the operation that the transmitting device is positioned according to the preset direction and the signal measurement result may include the following operations: according to the preset direction and a position and height of the meta-surface, position coordinates $(x_i, y_i)$ of the reflected beam corresponding to each preset direction in the target area are determined, and a value of the signal measurement result corresponding to the preset direction is determined as a z-coordinate $z_i$ corresponding to the position coordinates $(x_i, y_i)$, wherein i is an identifier of the reflected beam corresponding to the preset direction: Gaussian function fitting is performed according to a coordinate range of the target area, the position coordinates (xi, yi) and the corresponding z-coordinate zi to obtain a fitted Gaussian function, and a positioning result of positioning the transmitting device is determined according to coordinates corresponding to a vertex of the fitted Gaussian function.

In an exemplary embodiment, the operation that Gaussian function fitting is performed according to a coordinate range of the target area, the position coordinates (xi, yi) and the corresponding z-coordinate zi to obtain a fitted Gaussian function, and a positioning result of positioning the transmitting device is determined according to coordinates corresponding to a vertex of the fitted Gaussian function may include the following operations: an x-coordinate range and a y-coordinate range of the target area are sampled respectively according to a preset coordinate interval to obtain an x-coordinate set and a y-coordinate set after sampling: a z-coordinate zw corresponding to each x-coordinate xw in the x-coordinate set is determined from the z-coordinate zi corresponding to the position coordinates (xi, yi), and a z-coordinate zp corresponding to each y-coordinate yp in the y-coordinate set is determined from the z-coordinate zi corresponding to the position coordinates (xi, yi), wherein both w and p are positive integers in an interval [1, n], and n is the number of samples sampled: one-dimensional Gaussian function fitting is performed according to a coordinate set (xw, zw) composed of the x-coordinate set and the z-coordinate zw corresponding to each x-coordinate xw in the x-coordinate set to obtain a fitted first Gaussian function; and one-dimensional Gaussian function fitting is performed according to a coordinate set (yp, zp) composed of the y-coordinate set and the z-coordinate zp corresponding to each y-coordinate yp in the y-coordinate set to obtain a fitted second Gaussian function: a first coordinate xt corresponding to a vertex of the first Gaussian function and a second coordinate yt corresponding to a vertex of the second Gaussian function are determined, and xt and yt are determined respectively as an x-coordinate and a y-coordinate of the positioning result, xt being an x-coordinate within the x-coordinate range, and yt being a y-coordinate within the y-coordinate range.

For example, if in the target area, the x-coordinate is in the range of [xs, xe], the y-coordinate is in the range of [ys, ye], where xs, xe, ys and ye are all real numbers, xe>xs, and ye>ys, and the x-coordinate range and the y-coordinate range of the target area are sampled respectively according to the preset coordinate interval to obtain the sampled x-coordinate set and y-coordinate set, then in the above embodiment, xs≤xw≤xe, and ys≤yp≤ye; and in the obtained positioning result, xs≤xt≤xe, and ys≤yt≤ye.

It is to be noted that, in the above embodiment, the coordinates (i.e. the corresponding input when the Gaussian function is at its maximum value) corresponding to the vertexes (i.e. the maximum value of the Gaussian function, also the maximum value of the Gaussian curve corresponding to the Gaussian function) of two one-dimensional Gaussian functions may be determined respectively by fitting two one-dimensional Gaussian functions (namely fitting two one-dimensional Gaussian curves respectively to obtain two one-dimensional Gaussian functions, each one-dimensional Gaussian function corresponding to a Gaussian curve), so as to determine the position coordinates of the transmitting device (that is, determine the positioning result).

The operation that the z-coordinate zw corresponding to each x-coordinate xw in the x-coordinate set is determined from the z-coordinate zi corresponding to the position coordinates (xi, vi), and a z-coordinate zp corresponding to each y-coordinate yp in the y-coordinate set is determined from the z-coordinate zi corresponding to the position coordinates (xi, yi) may include the following operations: the z-coordinates corresponding to all the position coordinates whose x-coordinate is xw in the position coordinates (xi, yi) are determined, and the maximum value of the z-coordinates corresponding to all the position coordinates whose x-coordinate is xw is determined as the z-coordinate zw corresponding to the x-coordinate xw; and the z-coordinates corresponding to all the position coordinates whose y-coordinate is yp in the position coordinates (xi, yi) are determined, and the maximum value of the z-coordinates corresponding to all the position coordinates whose y-coordinate is yp is determined as the z-coordinate zp corresponding to Y-coordinate yp.

In an exemplary embodiment, the operation that the transmitting device is positioned according to the preset direction and the signal measurement result may include the following operations: according to the preset direction and a position and height of the meta-surface, position coordinates (xi, vi) of the reflected beam corresponding to each preset direction in the target area are determined, and a value of the signal measurement result corresponding to the preset direction is determined as a z-coordinate zi corresponding to the position coordinates (xi, yi), wherein i is an identifier of the reflected beam corresponding to the preset direction: two-dimensional Gaussian function fitting is performed according to a coordinate set (xi, yi, zi) composed of the position coordinates (xi, yi) and the z-coordinate zi to obtain a fitted two-dimensional Gaussian function; coordinates (xt, yt) corresponding to a vertex of the two-dimensional Gaussian function are determined, and the coordinates (xt, yt) are determined as a positioning result of positioning the transmitting device, xt being an x-coordinate within the x-coordinate range of the target area, and yt being a y-coordinate within the y-coordinate range of the target area.

For example, if the x-coordinate range corresponding to the target area is [xs, xe], and the y-coordinate range is [ys, ye], where xs, xe, ys and ye are all real numbers, xe>xs, and ye>ys, the obtained positioning result is as follows: xs≤xt≤xe, and ys≤yt≤ye.

It is to be noted that in the above embodiment, the position coordinates of the transmitting device may be determined by the two-dimensional Gaussian function fitting (that is, the Gaussian surface fitting is performed). The fitting may be realized by using the least square method and the minimum mean square error method.

In an exemplary embodiment, after the signal measurement result corresponding to the preset direction is determined, and the transmitting device is positioned according to the preset direction and the signal measurement result, the method may include the following operation: the target direction information is determined according to a positioning result of positioning the transmitting device, the target direction information being used for instructing the meta-surface control unit to control a reflection coefficient of each electromagnetic unit of the meta-surface according to the target direction information, so that the reflected beam formed on the meta-surface by the radio signal transmitted by the receiving device points to the transmitting device.

After the target direction information is determined, the receiving device sends the target direction information to the meta-surface control unit, so as to instruct the meta-surface control unit to control the reflection coefficient of the meta-surface according to the target direction information, so that the reflected beam formed on the meta-surface by the radio signal transmitted by the receiving device (i.e. the base station) points to the transmitting device, and thus the radio signal transmitted by the base station can reach the terminal accurately.

The positioning method for a transmitting device in the above embodiment is explained with an example, but the example is not intended to limit the technical solution of the embodiments of the present disclosure.

In the related art, using the beam-adjustable meta-surface (also called reconfigurable meta-surface, namely the meta-surface in the above embodiment) to enhance the coverage of non-direct diameter areas of mobile networks is a very effective and low-cost method. Relevant methods will be given in the present disclosure, and the characteristics of the meta-surface can be used to achieve the accurate alignment of the target beam direction, so that a deployment scheme of the meta-surface is self-complete: besides, in the non-direct diameter areas with enhanced meta-surface coverage, the terminal can be positioned accurately. That is, in the embodiments of the present disclosure, with the deployment of the meta-surface, a non-direct diameter terminal can be positioned by use of a single base station.

In the embodiments of the present disclosure, the following nodes are mainly involved: a receiving device and a transmitting device.

The receiving device is configured to determine beam scanning planning, and send relevant information of the beam scanning planning to the transmitting device by means of the radio frequency unit. The relevant information of the beam scanning planning includes a beam scanning interval (the beam scanning interval is the time interval between the beam control start time and the beam control end time in the above embodiments), a specific pilot sequence of the transmitting device (i.e. the target pilot signal in the above embodiments), and related time-frequency resources. The operation that the beam scanning planning is determined refers to a process in which the receiving device divides the target area into grids or plans the direction of the target beam, and converts two-dimensional space domain planning of the target area into one-dimensional time domain planning. For example, the receiving device determines the grids corresponding to a chronological order (i.e. the temporal information in the above embodiments) according to an order of scanning the grids in the target area (i.e. the sub-area in the above embodiments), and determines the preset direction information corresponding to each grid. That is, each piece of preset direction information has a corresponding target time period. In an exemplary embodiment, the receiving device also sends the beam control start time and the beam control end time to the transmitting device.

The transmitting device is configured to transmit the target pilot signal according to the time-frequency resources configured by the receiving device in the beam scanning interval. When the target pilot signal is transmitted, the beam is adjusted by means of the radio frequency unit in the transmitting device, and the transmitted beam is aligned to the meta-surface (the target pilot signal is transmitted to the meta-surface). It is to be noted that in the above embodiment, the pilot sequence (i.e. the target pilot signal in the above embodiment) transmitted by the transmitting device is a coding sequence that is known in advance by both the transmitting device and the receiving device and can be used for distinguishing different transmitting devices. The coding sequence has good characteristics of autocorrelation and cross-correlation.

The receiving device is further configured to control the meta-surface by the meta-surface control unit in the beam scanning interval, that is, adjust, within the target time period, a reflection coefficient of each electromagnetic unit of the meta-surface to the target reflection coefficient corresponding to the target time period, so as to realize the scanning of the target area in the beam scanning interval.

The receiving device is further configured to identify the transmitting device and measure the radio signal strength (i.e. the signal measurement result in the above embodiment) based on the received pilot sequence. Multiple transmitting devices may simultaneously transmit the pilot signals at the same time.

The operation that the meta-surface is controlled by the meta-surface control unit may include the following operation: the receiving device sends the control information to the meta-surface control unit through an interface between the receiving device and the meta-surface control unit. The control information includes, but is not limited to, the following: the beam control start time, the adjustment and control direction of a beam, the target reflection coefficient of each electromagnetic unit, the input parameter for determining the target reflection coefficient of each electromagnetic unit, the temporal information, the beam control end time, etc. The control information may be a beam target to which adjustment is about to be performed or adjustment and control instructions for each electromagnetic unit of the meta-surface. When these instructions are applied to each electromagnetic unit, the electromagnetic unit can change or adjust the reflection coefficient (also called input reflection coefficient), so that the reflection coefficient of each electromagnetic unit in the meta-surface is adjusted to the target reflection coefficient corresponding to the target time period.

It is to be noted that in the embodiments of the present disclosure, the receiving device may determine the control information (including the preset direction information used for making the beam in the direction from the receiving device to the meta-surface form on the meta-surface the reflected beam in the preset direction) in advance, and after determining the control information, control the meta-surface by the meta-surface control unit in the beam scanning interval according to the control information. When controlling the meta-surface according to the control information, the receiving device does not transmit a signal to the meta-surface, and there is no signal transmitted to the meta-surface by the receiving device. That is, in the embodiments of the present disclosure, the purpose of adjusting the reflection coefficient of the meta-surface to the target reflection coefficient is to adjust the state of the meta-surface to a state of generating a virtual reflected beam along the preset direction, and the virtual reflected beam is the reflected beam formed on the meta-surface when the radio signal is transmitted to the meta-surface by means of an analog receiving device, that is, the radio signal transmitted by the receiving device to the meta-surface is an analog signal, and the receiving device does not actually need to transmit the radio signal. Therefore, in the embodiments of the present disclosure, after the receiving device determines the control information, the receiving device does not need to transmit the radio signal to the meta-surface when the transmitting device is positioned.

Based on the above embodiments, by adjusting the reflection coefficient of each electromagnetic unit of the meta-surface, a virtual main beam reflected by the meta-surface (i.e. the above virtual reflected beam) can point to different target directions (i.e. the preset direction in the above embodiments) according to the predetermined time period (i.e. the target time period in the temporal information in the above embodiments), so as to realize the scanning of the target area.

In the above embodiments, the receiving device measures and records the radio signal quality of the target pilot signal transmitted by each transmitting device in the beam scanning interval, that is, in the beam scanning interval, the receiving device measures the signal quality of the received target pilot signal based on the known target pilot signal, and records each signal quality and the corresponding target time period. That is, the signal measurement result set composed of the signal measurement results recorded by the receiving device is the radio signal quality in chronological order (that is, the signal measurement result set is time sequence data), and each signal measurement result corresponds to the adjustment and control time sequence of the beam of the meta-surface (that is, the temporal information composed of the target time periods corresponding to the signal measurement results in the signal measurement result set is consistent with the temporal information used for controlling the meta-surface).

In the embodiments of the present disclosure, the receiving device is further configured to estimate the target beam direction and position the transmitting device based on the measurement results of the receiving device (i.e. the signal measurement results in the above embodiments).

The operation that the target beam direction is estimated and the transmitting device is positioned based on the measurement results of the receiving device may include the following operations: (1) based on the measurement results of the receiving device and the adjustment and control time sequence of the beam of the meta-surface, when it is determined that main adjustment and control beam of the meta-surface points to different directions, the receiving device measures the radio signal quality for a certain terminal; and (2) the position of the terminal and the target beam direction are estimated based on the radio signal quality of different directions of the main adjustment and control beam. The exemplary implementation of operation (2) may be performed in the receiving device or other network positioning devices.

When the terminal is positioned, one-dimensional time data may be transformed into two-dimensional space data based on the beam direction of the meta-surface and related measurement results. For example, the position of the terminal is determined through two-dimensional surface fitting algorithms. The two-dimensional surface fitting algorithms include, but are not limited to, two-dimensional Gaussian distribution surface, least square method, minimum mean square error method, etc., or two independent Gaussian curves reduced to one dimension are used for fitting.

Figure 4:
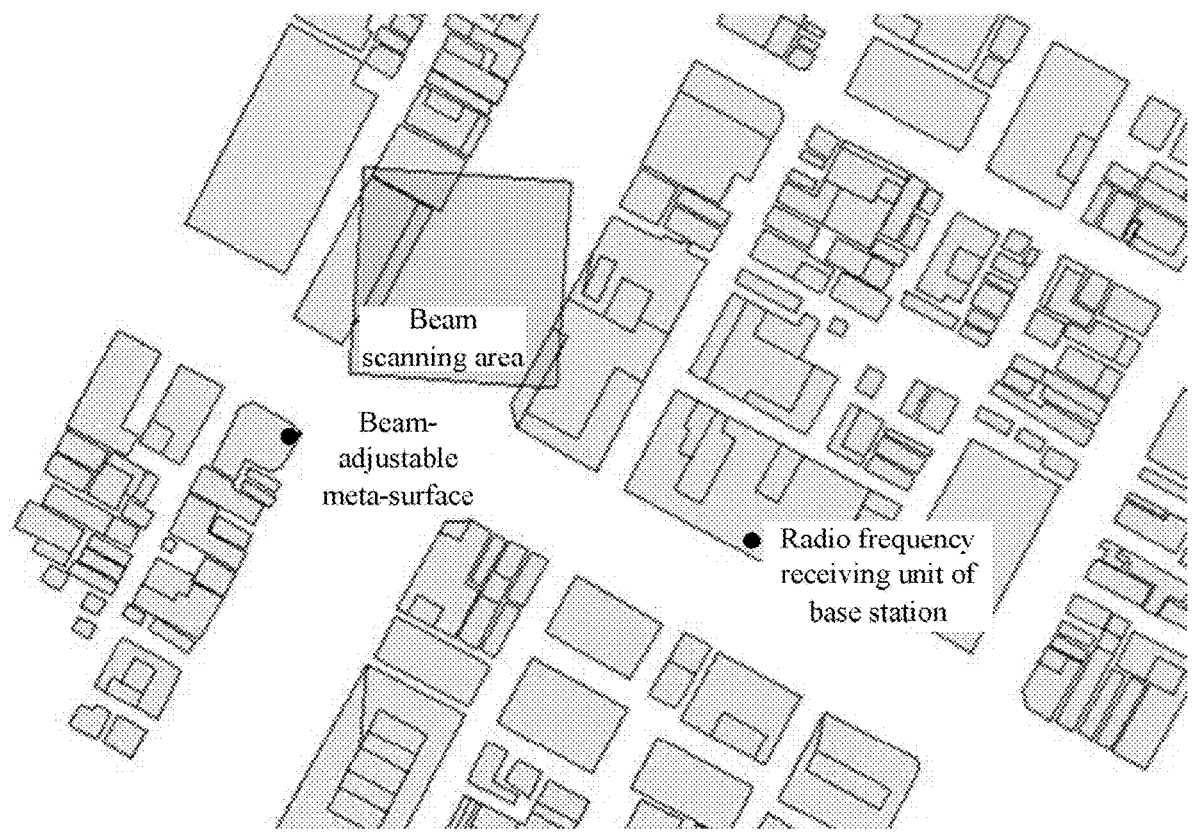
FIG. 4 is a plane diagram of a deployment scenario of a meta-surface according to an embodiment of the present disclosure.

FIG. 4 is a plane diagram of a deployment scenario of a meta-surface according to an embodiment of the present disclosure, showing a beam scanning area (i.e. the target area in the above embodiments) and the beam-adjustable meta-surface (i.e. the meta-surface in the above embodiments). In an exemplary application scenario of the present disclosure, deployment parameters of the receiving device (i.e. the base station where a radio frequency receiving unit of the base station in FIG. 4 is located) are as follows:
an antenna (i.e. the radio frequency unit) of the receiving device is installed on the top of a building with a height of 43 m (i.e. the position height of the antenna of the receiving device is 43 m);
the coordinates of the center point of a radio frequency transmitting unit of the receiving device are [0, 0, 43] (in meters);

horizontal azimuth Az is 120 degrees;
pitch angle EL is 10 degrees; and
rotation angle SL is 0 degree.

The deployment parameters of the meta-surface are as follows:
the center point position of the meta-surface is [21.67, 133.2, 36.2] (in meters) (i.e. the position and height of the meta-surface in the above embodiments);
horizontal azimuth Az is −60 degrees;
pitch angle EL is 0 degrees; and
rotation angle SL is 0 degree.

The parameters of the transmitting device and the meta-surface are configured as follows:
carrier frequency Fc is 28 GHz;
polarization: vertical polarization;
Equivalent Isotropically Radiated Power (EIRP) of the base station is 43 dBm;
the size of the meta-surface is 20λ (length)×20λ (width), where λ is the wavelength of the carrier frequency;
the size of the meta-surface control unit is λ/3 (length)× λ/3 (width);
a phase control granularity of the meta-surface is 2-bits (that is, two bits are used to indicate the phase of the meta-surface, so there are four optional phases: [0, π/2, π, 3π/2] (in radians);
a Sub-Carrier Space (SCS) is 30 KHz;
the length of a radio frame is 10 ms;
the number of time slots in each radio frame is 20;
the receiving device sets a scanning beam update frequency as each time slot.

When the positioning accuracy of the positioning method for the transmitting device in the embodiments of the present disclosure is tested, with reference to the transmitting device A at the position coordinates [78, 88] (in meters) and the transmitting device B at the position coordinates [76, 98] (in meters) in the target area, the positioning accuracy of the positioning method in the embodiments of the present disclosure is tested.

In the embodiments of the present disclosure, the positioning method may include the following operations.

At S1, the receiving device determines the beam scanning planning: from the first time slot (the time period corresponding to the first time slot is the first target time period, and the start time of the first target time period also corresponds to the time of starting the adjustment and control of the beam in the above embodiments) to the 180th time slot (i.e. the 180th target time period, which is also the last target time period in the temporal information, and the end time of the last target time period also corresponds to the time of ending the adjustment and control of the beam in the above embodiments), beam scanning in the beam scanning area (i.e. the target area in the above embodiments) in FIG. 4 is performed, and the receiving device sends the relevant information of the beam scanning planning to the transmitting device by means of the radio frequency unit. The relevant information includes: each target time period in the temporal information (the start time of the first target time period in the temporal information (also the time of starting the adjustment and control of the beam), the end time of the last target time period (i.e. the time of ending the adjustment and control of the beam), and the time period from the beam control start time and the beam control end time are adjustment and control intervals of the beam), the specific pilot sequence of the transmitting device (i.e. the target pilot signal corresponding to the transmitting device), and the related time-frequency resources.

At S2, the radio frequency unit of the transmitting device adjusts the beam to align to the meta-surface, and transmits the pilot sequence signal (i.e. the target pilot signal in the above embodiments) in the beam scanning interval according to the time-frequency resources configured by the receiving device. The pilot sequence signals of different transmitting devices can be distinguished through frequency division or code division.

At S3, the receiving device controls the direction of the virtual beam of the meta-surface by the meta-surface control unit. The frequency of updating the beam scanning direction of the meta-surface is each time slot. In a certain time slot (i.e. the time period corresponding to the time slot), the virtual reflected beam reaches the beam scanning area along a certain preset direction. After each update, the beam will be aligned to the next new predetermined direction (that is, the preset direction in the above embodiments).

Figure 5:
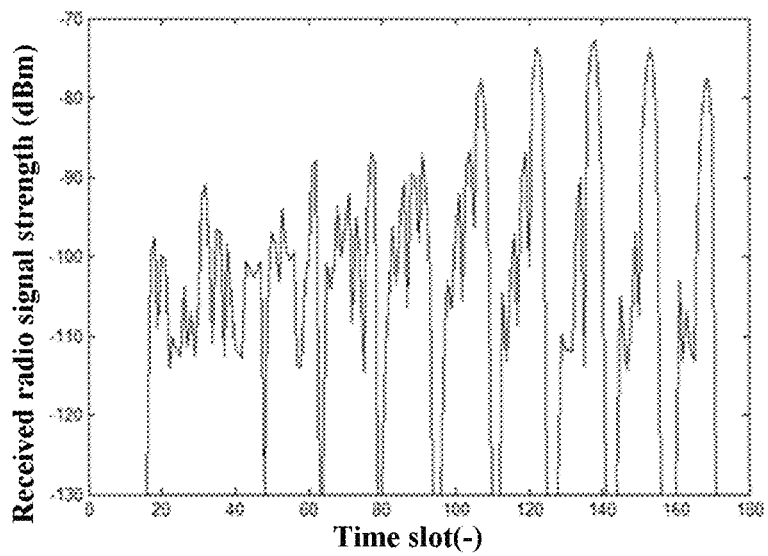
FIG. 5 is a schematic diagram of the radio signal quality recorded by a receiving device according to an embodiment of the present disclosure.
Figure 6:
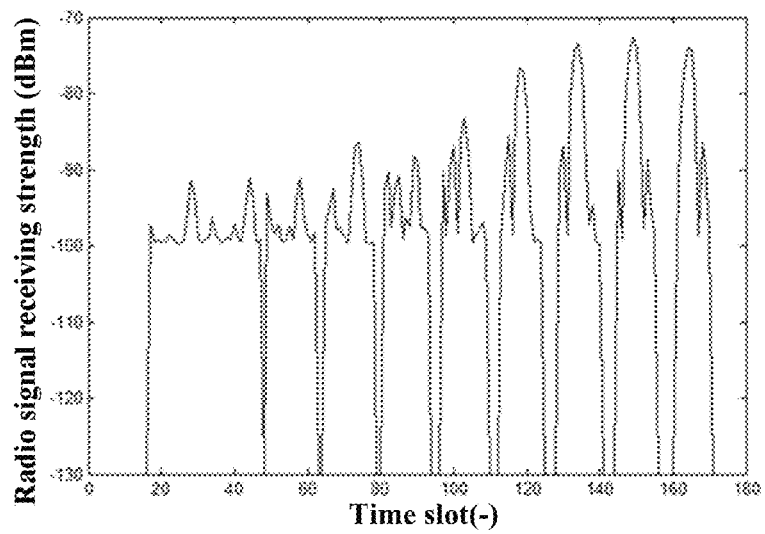
FIG. 6 is a schematic diagram of the radio signal quality recorded by a receiving device according to another embodiment of the present disclosure.

At S4, the receiving device measures and records the radio signal quality of the wireless pilot signal transmitted by the relevant transmitting device in the beam scanning interval, and the results are shown in FIG. 5 and FIG. 6. FIG. 5 shows signal receiving strength obtained by the receiving device after measuring the received target pilot signal which is transmitted by the transmitting device A. FIG. 6 shows signal receiving strength obtained by the receiving device after measuring the received target pilot signal which is transmitted by the transmitting device B. The horizontal axes in FIG. 5 and FIG. 6 are the time slots arranged in sequence. Because each time slot lasts for certain duration, each time slot may correspond to a time period (i.e. the target time period in the above embodiments). For example, if the length of a time slot is a (in milliseconds), the k-th target time period (i.e. the time period corresponding to the k-th time slot) in the temporal information is the time period between $t0+(k-1)a$ and $t0+ka$, where t0 is the beam control start time (in milliseconds), and k is an integer greater than or equal to 1.

At S5, the target beam direction is estimated and the transmitting device is positioned based on the measurement results of the receiving device.

Figure 7:
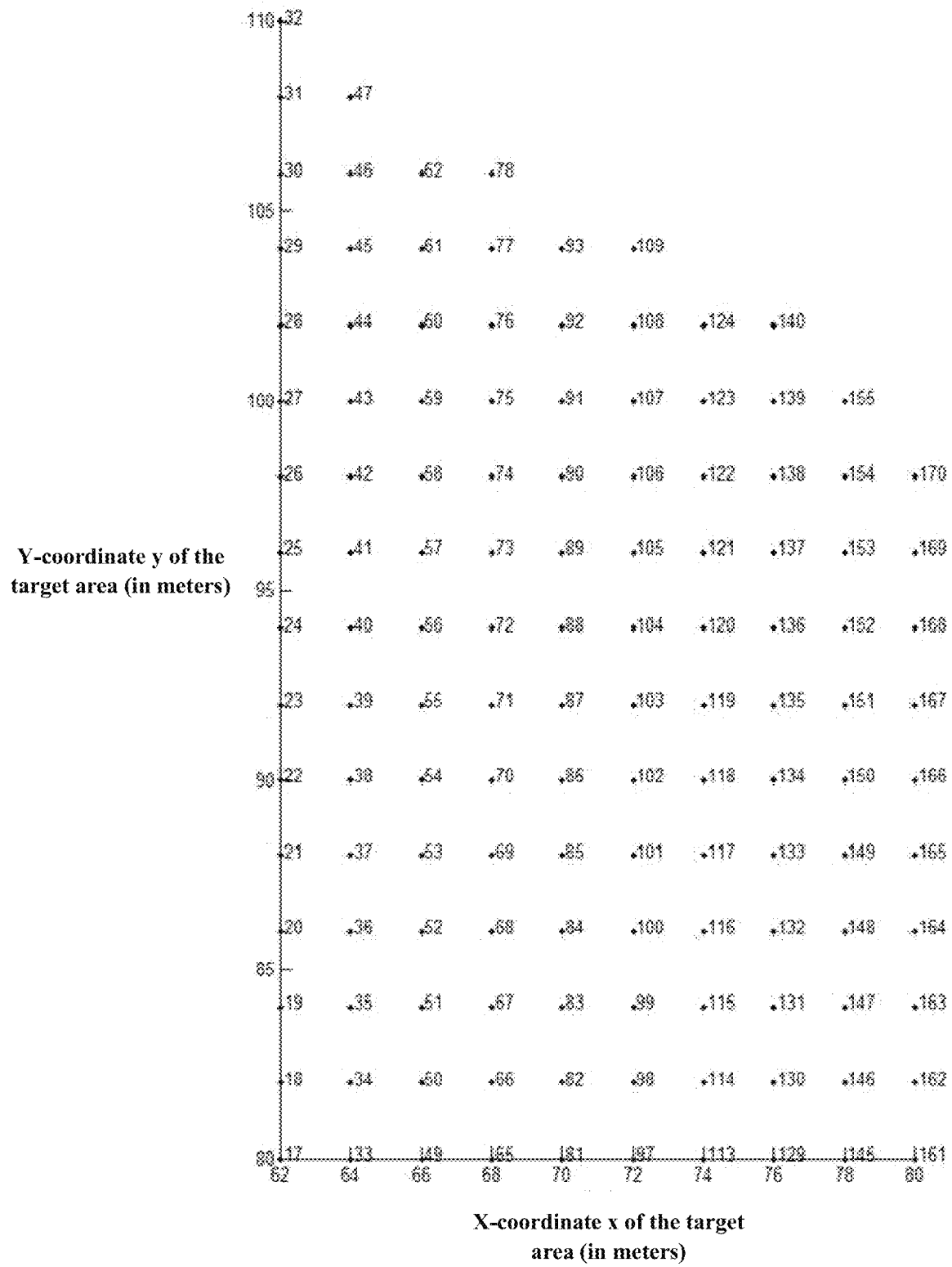
FIG. 7 is a schematic diagram of a corresponding relationship between time slots corresponding to the radio signal quality and position coordinates in a target area according to an embodiment of the present disclosure.
Figure 8:
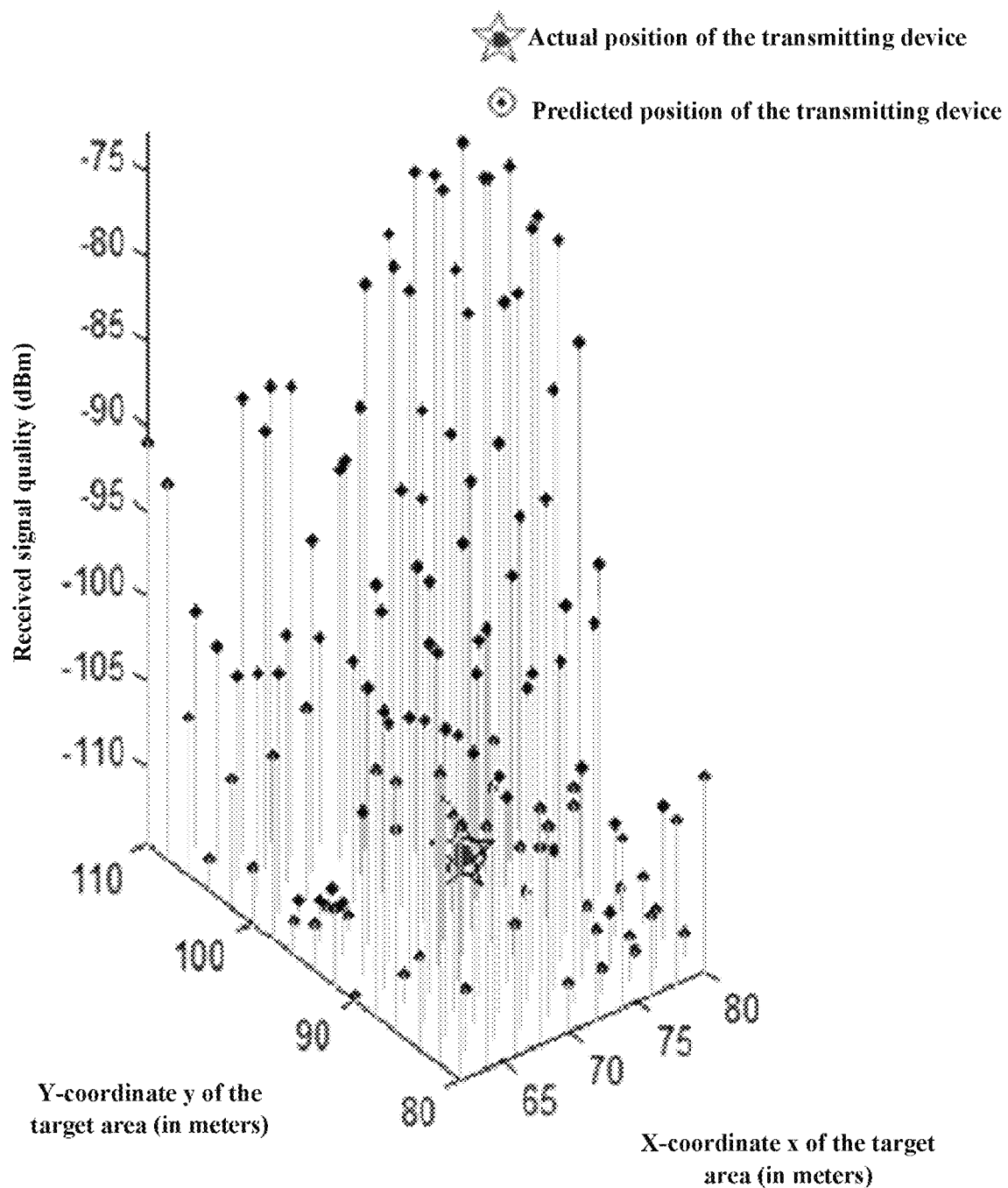
FIG. 8 is a schematic three-dimensional view of the radio signal quality and position coordinates in a target area according to an embodiment of the present disclosure.
Figure 9:
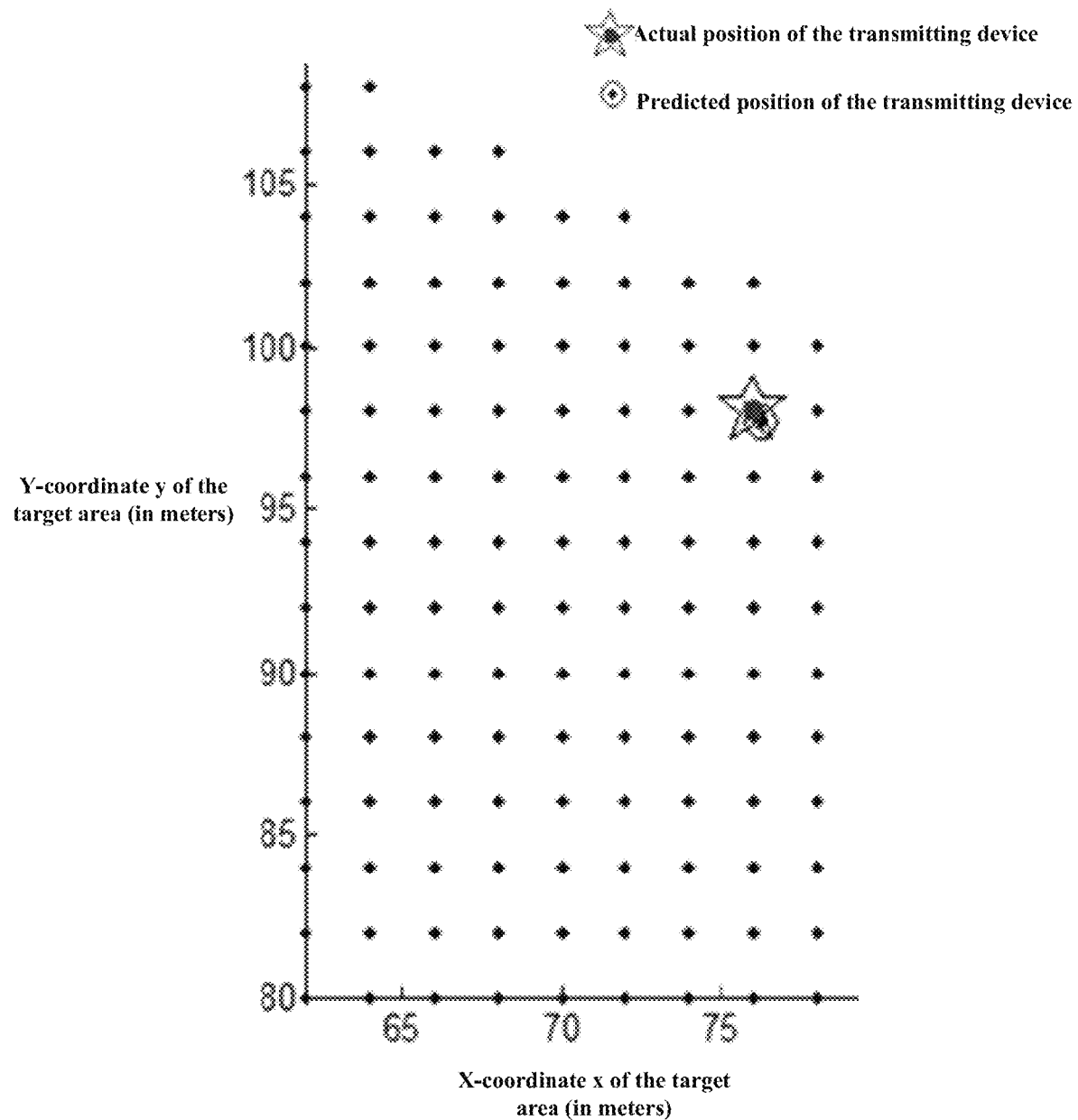
FIG. 9 is a schematic plane view of the radio signal quality and position coordinates in a target area according to an embodiment of the present disclosure.

When the transmitting device is positioned, the format of the measurement results in a measurement period for a certain transmitting device (for example, the transmitting device A) is as follows: (slotNo indicates a time slot number, namely each target time period in the above embodiments, RxPwr indicates a receiving level, namely the signal measurement result in the above embodiments)

slotNo 1: RxPwr −130; (that is, within the first target time period (i.e. the time period corresponding to the first time slot), the signal strength level of the received target pilot signal is −130 dbm)

slotNo 57: RxPwr −87.31:

A networking positioning node (which may be a receiving device or a network positioning device different from the receiving device in the network) maps the time slot number to the target beam direction, and transforms the one-dimensional time data in FIG. 7 obtained for the transmitting device A into the two-dimensional space data (FIG. 8) in combination with the position and height of the center of the meta-surface (i.e. the position and height of the meta-surface in the above embodiments), at the same time, maps the measurement result to the ground of the beam scanning area, seeing FIG. 9 (that is, FIG. 9 is the plan of FIG. 8). The number next to each dot "•" in FIG. 7 indicates the time slot number, for example, the two annotations •31 and •47 in the second line of FIG. 7, where "37" and "47" respectively represent that the corresponding time slot numbers are 31 and 47. According to FIG. 7, the position coordinates corresponding to each time slot number can be determined. The horizontal axis and longitudinal axis in FIG. 8 represent the x-coordinate and the y-coordinate of the target area respectively, and the vertical axis (z axis) represents the received signal quality: A predicted position of the transmitting device is a positioning result obtained by positioning the transmitting device (i.e. the coordinates in the positioning result). The horizontal axis and the longitudinal axis in FIG. 9 represent the x-coordinate and the y-coordinate of the target area respectively. Each dot "•" in FIG. 9 represents the presence of received signal quality, and the specific received signal quality is shown in the z-coordinates in FIG. 8.

Figure 10:
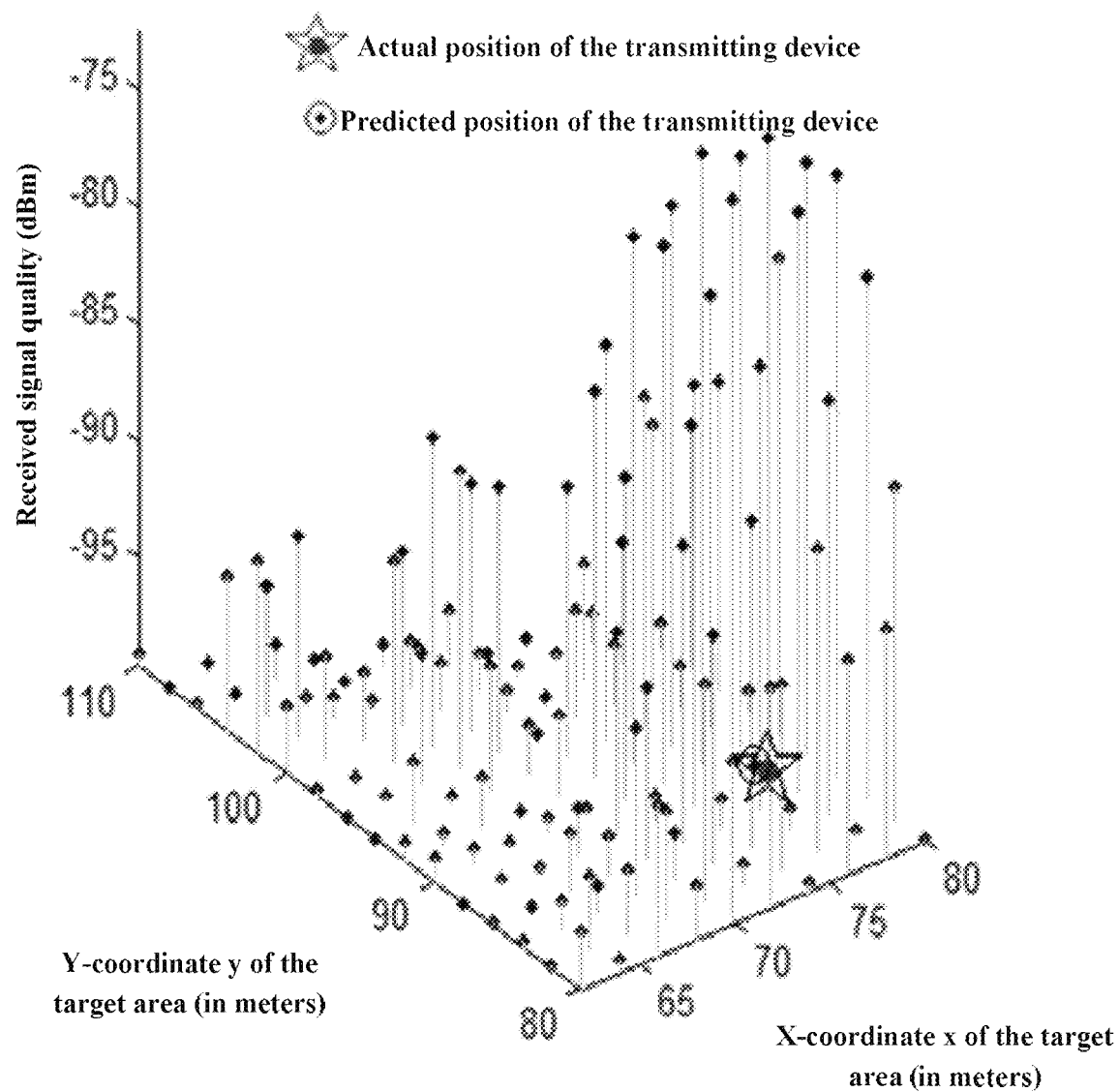
FIG. 10 is a schematic three-dimensional view of the radio signal quality and position coordinates in a target area according to another embodiment of the present disclosure.
Figure 11:
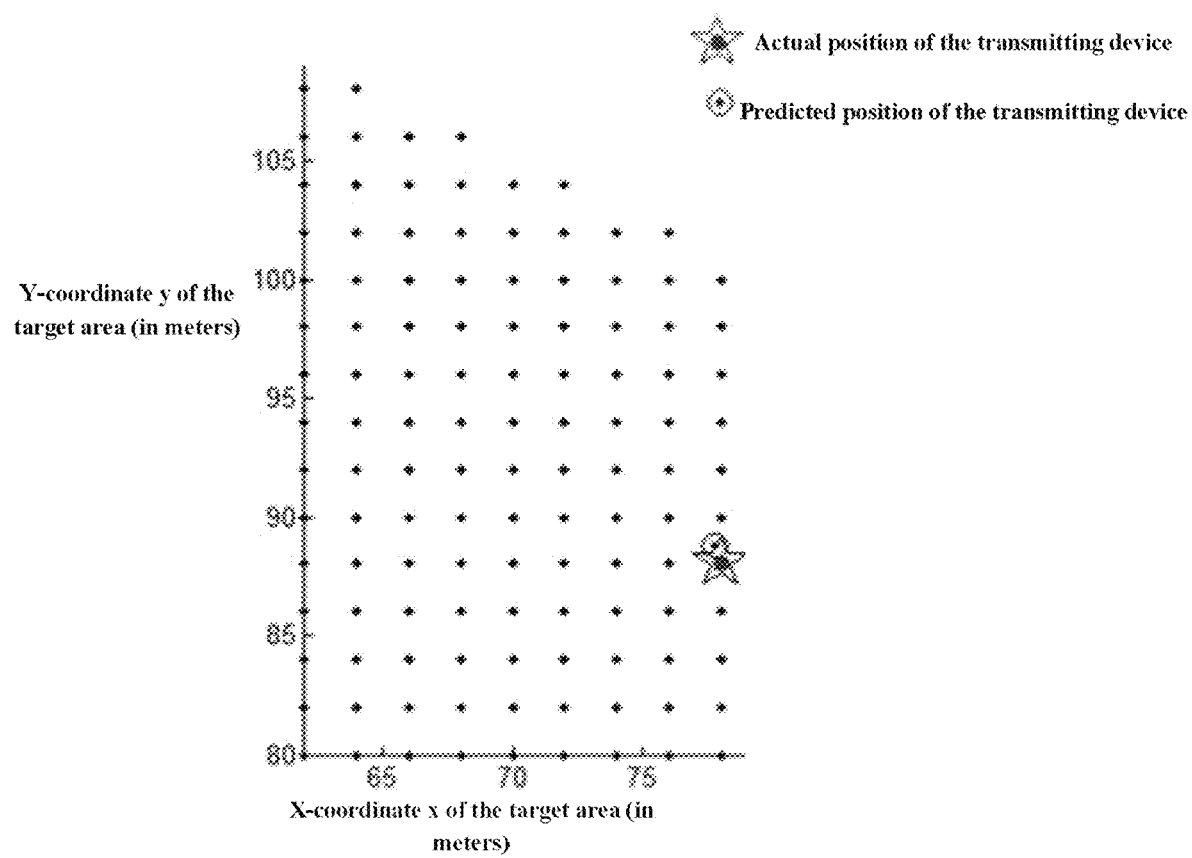
FIG. 11 is a schematic plane view of the radio signal quality and position coordinates in a target area according to another embodiment of the present disclosure.

Moreover, the one-dimensional time data obtained by measuring the received pilot signal transmitted by the transmitting device B is transformed into the two-dimensional space data (as shown in FIG. 10), at the same time, the measurement result is mapped to the ground of the beam scanning area, seeing FIG. 11 (that is, FIG. 11 is the plan of FIG. 10).

X coordinate and Y coordinate of the transmitting device are independently estimated by using a dimensionality reduction method, as follows:

the position [xi, yi] of each virtual reflected beam on the ground is determined based on each beam direction of the meta-surface and the height of the meta-surface (i.e. the position and height of the meta-surface), where i is an identifier of a beam, which is equal to the time slot number in the present embodiment.

1. Data dimensionality reduction is performed in X-axis and Y-axis directions, including the following operations.
   (1) The X axis is segmented (that is, the x-coordinate range is segmented), the segmenting interval is 2, and the set composed of the coordinates corresponding to the center points of all the segments is [62, 64, 66 . . . , 80] (i.e. the x-coordinate set in the above embodiments).
   (2) The Y axis is segmented (that is, the y-coordinate range is segmented), the segmenting interval is 2, and the set composed of the coordinates corresponding to the center points of all the segments is [80, 82, 84 . . . , 110] (i.e. the y-coordinate set in the above embodiments).
2. A dimensionality reduction receiving level of each segment is determined, including the following operations.
   (1) The following operation is performed for all the two-dimensional data in FIG. 8 (that is, the following operation is performed for the radio signal received quality obtained by measuring the received target pilot signal transmitted by the transmitting device A): according to the segmentation result in the X-axis direction, for the set [62, 64, 66, . . . , 80] composed of the coordinates corresponding to the center points of the segments on the X axis, the dimensionality reduction receiving level corresponding to the coordinates of each center point is determined (in an exemplary embodiment, the strongest radio signal received quality in each segment is determined as the unique dimensionality reduction receiving level in this segment, that is, for the coordinate xw of a certain center point, the maximum value (i.e. zw) of the radio signal received quality (i.e. the receiving level) corresponding to this coordinate xw is determined), and the result is as follows:

[62, RxPwrx1;
64, RxPwrx2;
66, RxPwrx3;
80, RxPwrx10].

Figure 12:
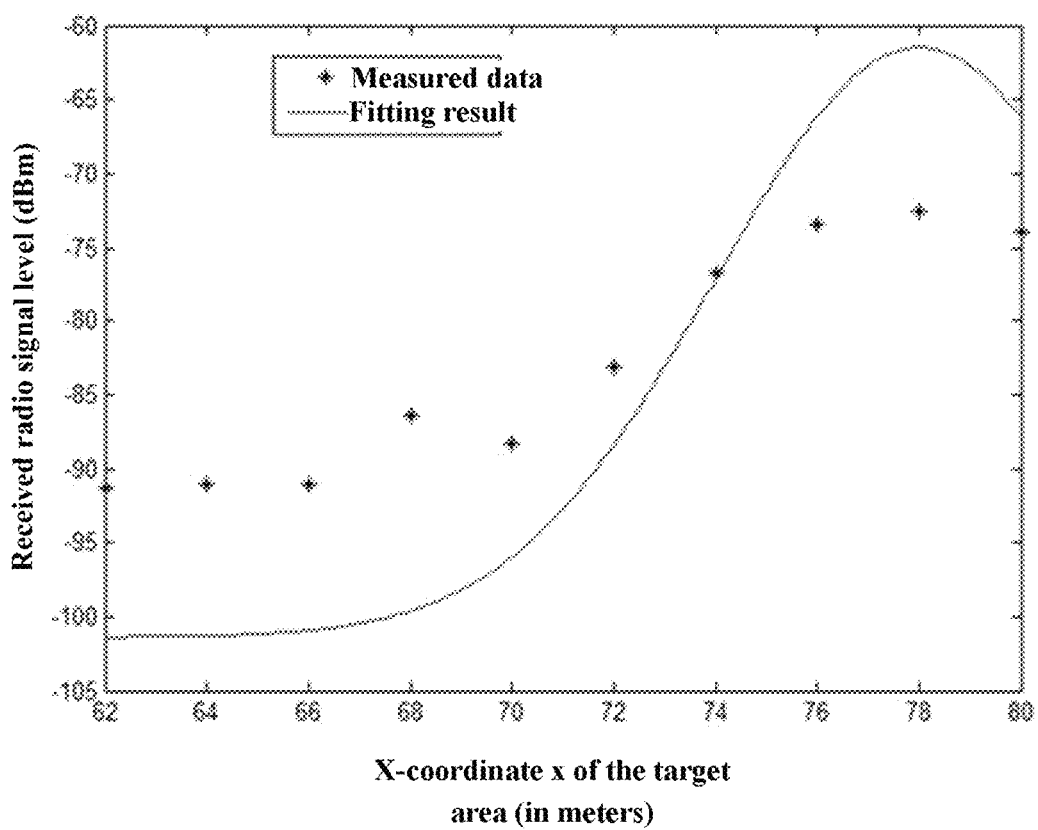
FIG. 12 is a schematic diagram of fitting between the radio signal quality and a one-dimensional Gaussian function in the direction of X axis according to an embodiment of the present disclosure.

The obtained coordinate set in the X-axis direction and the corresponding radio signal quality are the measured data shown in FIG. 12.

For all the two-dimensional data in FIG. 8, the radio signal quality is assigned to its segment according to the segmentation result in the Y direction, and the coordinate set of the center points of the segments on the Y axis is [80, 82, 84 . . . , 110]. The strongest radio signal received quality in each segment is determined as the unique dimensionality reduction receiving level in this segment (that is, for each y-coordinate yp in the y-coordinate set, zp corresponding to the yp is determined in a specific determining mode similar to the above processing mode of the X-axis direction), and the result is as follows:

[80, RxPwry1
82, RxPwry2
84, RxPwry3 . . . ,
110, RxPwry 16].

Figure 13:
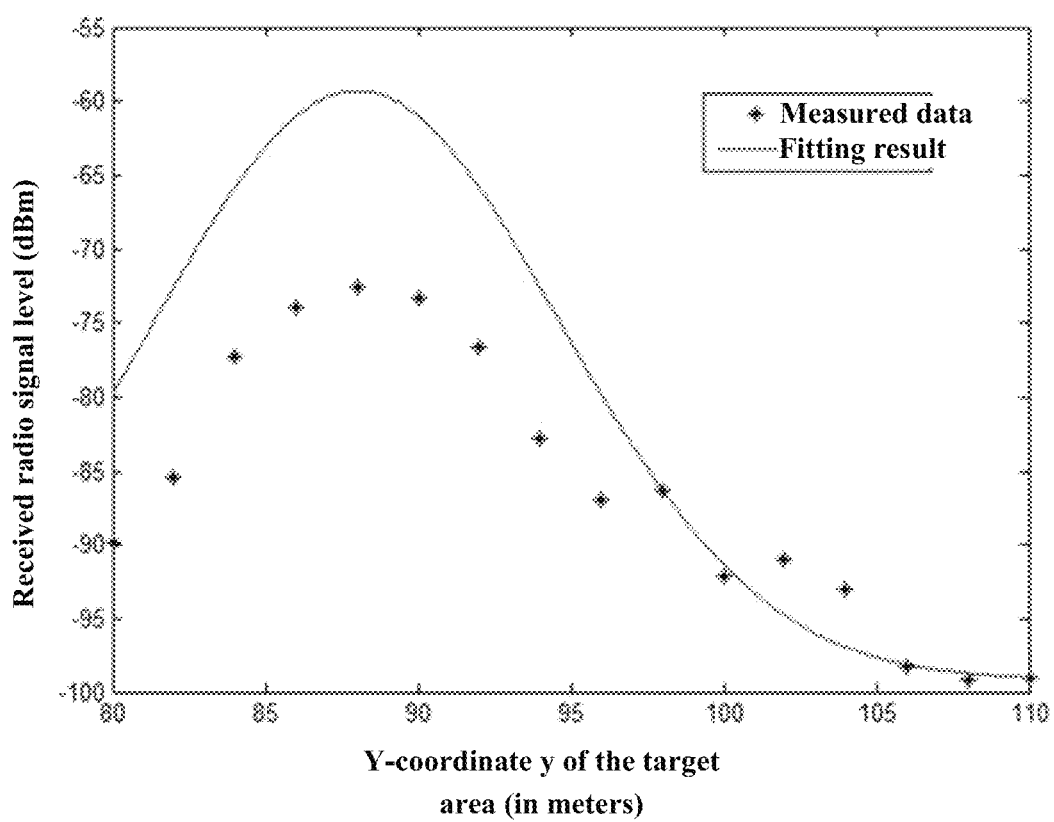
FIG. 13 is a schematic diagram of fitting between the radio signal quality and a one-dimensional Gaussian function in the direction of Y axis according to an embodiment of the present disclosure.

The obtained coordinate set in the Y-axis direction and the corresponding radio signal quality are the measured data shown in FIG. 13.

(2) The following operation is performed for all the two-dimensional data in FIG. 10 (that is, the following operation is performed for the radio signal received quality obtained by measuring the received target pilot signal transmitted by the transmitting device B): according to the segmentation result in the X-axis direction, for the set [62, 64, 66, . . . , 80] composed of the coordinates corresponding to the center points of the segments on the X axis, the dimensionality reduction receiving level corresponding to the coordinates of each center point is determined (in an exemplary embodiment, the strongest radio signal received quality in each segment is determined as the unique dimensionality reduction receiving level in this segment, that is, for the coordinate xw of a certain center point, the maximum value (i.e. zw) of the radio signal received quality (i.e. the receiving level) corresponding to this coordinate xw is determined), and the result is as follows:

[62, RxPwrx1;
64, RxPwrx2;
66, RxPwrx3; . . . ,
80, RxPwrx10].

Figure 14:
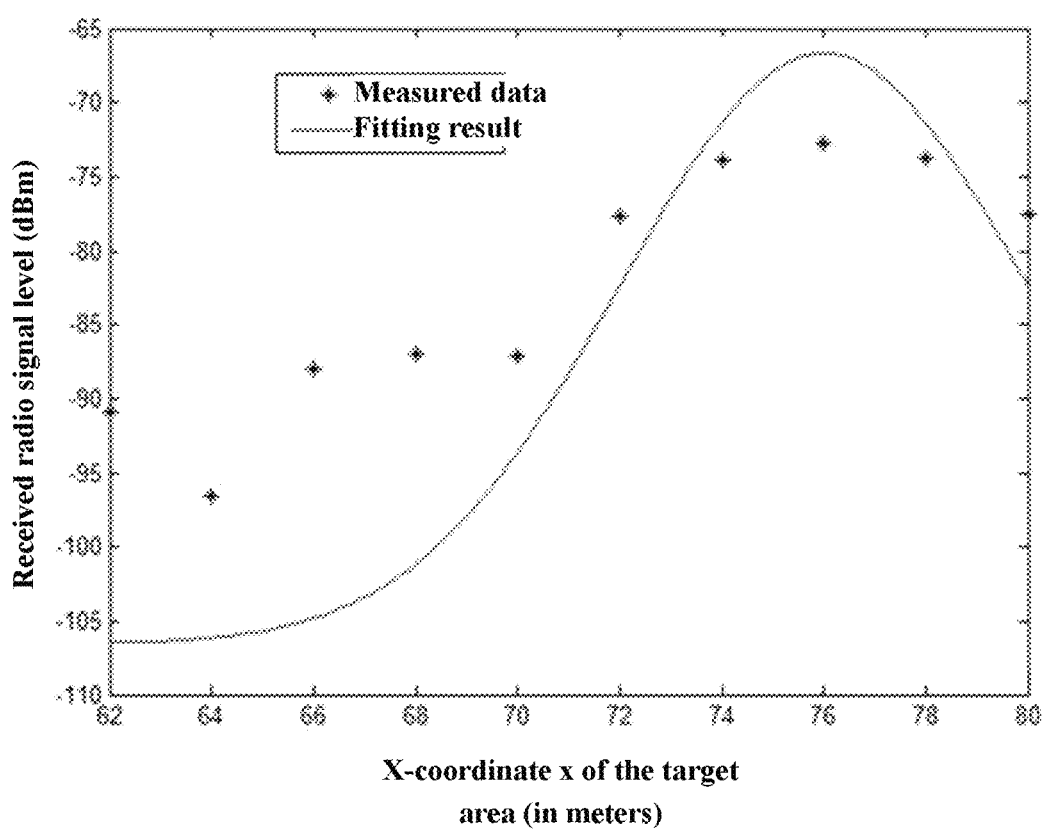
FIG. 14 is a schematic diagram of fitting between the radio signal quality and a one-dimensional Gaussian function in the direction of X axis according to another embodiment of the present disclosure.

The obtained coordinate set in the X-axis direction and the corresponding radio signal quality are the measured data shown in FIG. 14.

For all the two-dimensional data in FIG. 10, the radio signal quality is assigned to its segment according to the segmentation result in the Y direction, and the coordinate set of the center points of the segments on the Y axis is [80, 82, 84 . . . , 110]. The strongest radio signal received quality in each segment is determined as the unique dimensionality reduction receiving level in this segment (that is, for each y-coordinate yp in the y-coordinate set, zp corresponding to the yp is determined), and the result is as follows:

[80, RxPwry1
82, RxPwry2
84, RxPwry3 . . . ,
110, RxPwry16].

Figure 15:
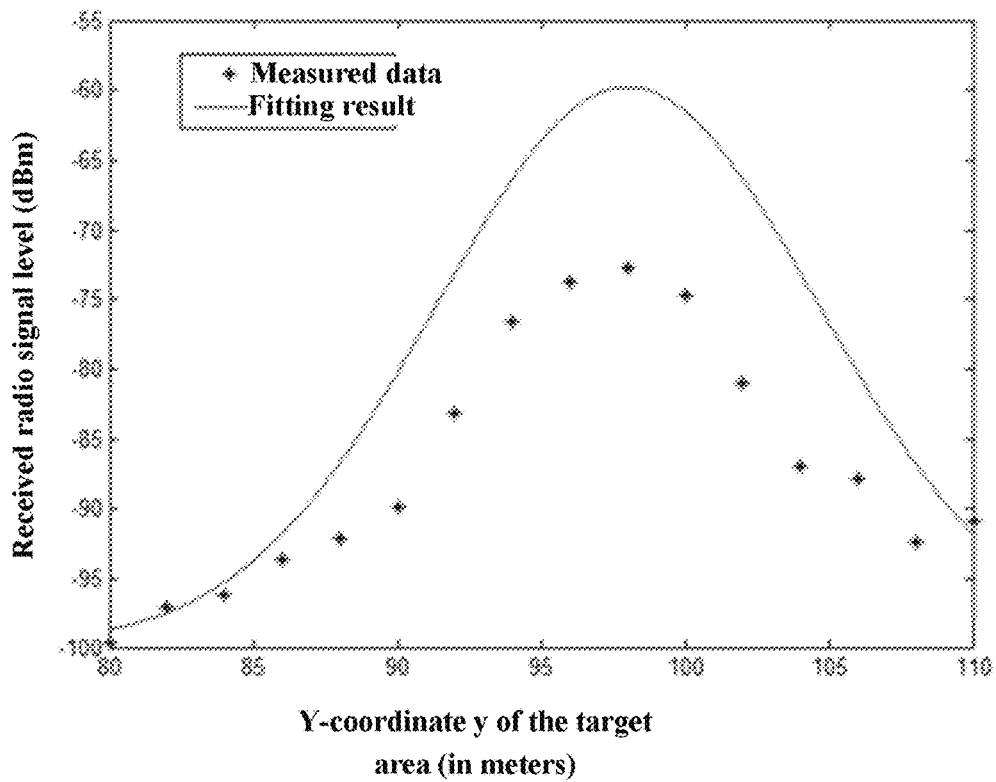
FIG. 15 is a schematic diagram of fitting between the radio signal quality and a one-dimensional Gaussian function in the direction of Y axis according to another embodiment of the present disclosure.

The obtained coordinate set in the Y-axis direction and the corresponding radio signal quality are the measured data shown in FIG. 15.

It is to be noted that the above RxPwry1 to RxPwry16 are schematic representations of the determined dimensionality reduction receiving level.

(5) Positioning results and errors

The one-dimensional Gaussian function is selected as a fitting curve to perform one-dimensional Gaussian curve fitting (i.e. one-dimensional Gaussian function fitting) in the X-axis and Y-axis directions. In an exemplary embodiment, the parameters of the one-dimensional Gaussian function (i.e. the Gaussian curve corresponding to the one-dimensional Gaussian function, referring to a fitting result in FIG. 12) corresponding to the X-axis direction may be determined by the least square fitting, and the x coordinate (i.e. xt in the above embodiments) corresponding to the center point (i.e. the vertex, the maximum value of the function) of the function is determined; and, the parameters of the one-dimensional Gaussian function (i.e. the Gaussian curve corresponding to the one-dimensional Gaussian function, referring to a fitting result in FIG. 13) corresponding to the Y-axis direction may be determined by the least square fitting, and the y coordinate (i.e. yt in the above embodiments) corresponding to the center point of the function is determined. According to the positioning method in the embodiments of the present disclosure, the position coordinates of the transmitting device A obtained by positioning is [76.2230 97.6619]m, and the positioning error between the position coordinates and the real coordinate position of the transmitting A as the reference target is: 0.405 m.

For the transmitting device B, the results of performing the one-dimensional Gaussian curve fitting in the X-axis direction and the Y-axis direction are shown respectively in FIG. 14 and FIG. 15. The position coordinates of the transmitting device B obtained by positioning is [77.7978 88.7517]m, and the positioning error between the position coordinates and the real coordinate position of the transmitting B as the reference target is: 0.50378 m. It can be seen from the above that a more accurate positioning result can be obtained by using the positioning method in the embodiments of the present disclosure.

Through the above description of implementation modes, those having ordinary skill in the art may clearly know that the method according to the above embodiments may be implemented by means of software plus a necessary common hardware platform, certainly by means of hardware; but in many cases, the former is the better implementation. Based on this understanding, the essence of the technical solution of the embodiments of the present disclosure or the part making a contribution to the conventional art can be embodied in the form of software product. The computer software product is stored in a storage medium (for example, an ROM/an RAM, a magnetic disk, and a compact disc) and includes a number of instructions to make a computer device (which can be a personal computer, a server or a network device, etc.) perform all or part of the method in each embodiment of the present disclosure.

An embodiment also provides a positioning device for a transmitting device, which is configured to implement the above embodiments and exemplary implementations. The embodiments which have been elaborated will not be repeated here. The term "module" used below can realize a combination of software and/or hardware with an intended function. Although the device described in the following embodiment is realized through software better, the realization through hardware or a combination of software and hardware is possible and conceived.

Figure 16:
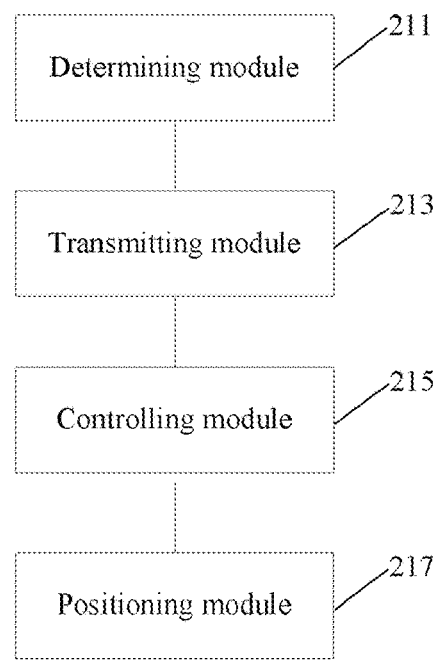
FIG. 16 is a structural block diagram of a positioning device for a transmitting device according to an embodiment of the present disclosure.

FIG. 16 is a structural block diagram of a positioning device for a transmitting device according to an embodiment of the present disclosure. As shown in FIG. 16, the positioning device includes: a determining module 211, a transmitting module 213, a controlling module 215, and a positioning module 217.

The determining module 211 is configured to determine the control information by the receiving device. The control information includes the temporal information and the control direction information. The control direction information is used for instructing the meta-surface control unit to adjust the reflection coefficient of the meta-surface to the target reflection coefficient corresponding to the preset direction, so that the beam in the direction from the receiving device to the meta-surface forms on the meta-surface the reflected beam in the preset direction. The preset direction is a direction indicated by preset direction information corresponding to a target time period, and the preset direction points to the target area. The temporal information includes the target time period. The control direction information includes the preset direction information.

The transmitting module 213 is configured to transmit the pilot signal to the meta-surface by the transmitting device. The transmitting device is located in the target area.

The controlling module 215 is configured to send the control information to the meta-surface control unit by the receiving device. The control information is used for instructing the meta-surface control unit to adjust the reflection coefficient of the meta-surface to the target reflection coefficient corresponding to the preset direction within the target time period.

The positioning module 217 is configured to determine the signal measurement result corresponding to the preset direction, and position the transmitting device according to the preset direction and the signal measurement result. The signal measurement result is a measurement result obtained by the receiving device measuring a received target pilot signal. The target pilot signal is received by the receiving device after reflected by the meta-surface whose reflection coefficient is adjusted to the target reflection coefficient. The pilot signals transmitted by the transmitting device include the target pilot signal.

Through the present disclosure, control information is determined by a receiving device, wherein the control information includes temporal information and control direction information; the control direction information is used for instructing a meta-surface control unit to adjust a reflection coefficient of a meta-surface to a target reflection coefficient corresponding to a preset direction, so that a beam in a direction from the receiving device to the meta-surface forms on the meta-surface a reflected beam in the preset direction: the preset direction is a direction indicated by preset direction information corresponding to a target time period, and the preset direction points to a target area: the temporal information includes the target time period; and the control direction information includes the preset direction information. A pilot signal is transmitted to the meta-surface by a transmitting device, wherein the transmitting device is located in the target area. The control information is sent to the meta-surface control unit by the receiving device, wherein the control information is used for instructing the meta-surface control unit to adjust the reflection coefficient of the meta-surface to the target reflection coefficient corresponding to the preset direction within the target time period. A signal measurement result corresponding to the preset direction is determined, and the transmitting device is positioned according to the preset direction and the signal measurement result, wherein the signal measurement result is a measurement result obtained by the receiving device measuring a received target pilot signal: the target pilot signal is received by the receiving device after reflected by the meta-surface whose reflection coefficient is adjusted to the target reflection coefficient; and the pilot signals transmitted by the transmitting device include the target pilot signal. Therefore, the technical problem in the related art that a terminal cannot be positioned by means of characteristics of a meta-surface can be solved, thereby achieving the effect of using the characteristics of a meta-surface to position a terminal.

An embodiment also provides a positioning system for a transmitting device, which is configured to implement the above embodiments and exemplary implementations. The embodiments which have been elaborated will not be repeated here. The system includes: a transmitting device, a receiving device, a meta-surface control unit, a meta-surface and a positioning node. The receiving device is configured to determine the control information. The control information includes the temporal information and the control direction information. The control direction information is used for instructing the meta-surface control unit to adjust the reflection coefficient of the meta-surface to the target reflection coefficient corresponding to the preset direction, so that the beam in the direction from the receiving device to the meta-surface forms on the meta-surface the reflected beam in the preset direction. The preset direction is a direction indicated by preset direction information corresponding to a target time period, and the preset direction points to the target area. The temporal information includes the target time period. The control direction information includes the preset direction information. The transmitting device is configured to transmit the pilot signal to the meta-surface. The transmitting device is located in the target area. The receiving device is further configured to send the control information to the meta-surface control unit. The control information is used for instructing the meta-surface control unit to adjust the reflection coefficient of the meta-surface to the target reflection coefficient corresponding to the preset direction within the target time period. The receiving device is further configured to determine the signal measurement result corresponding to the preset direction. The positioning node is configured to position the transmitting device according to the preset direction and the signal measurement result. The signal measurement result is a measurement result obtained by the receiving device measuring a received target pilot signal. The target pilot signal is received by the receiving device after reflected by the meta-surface whose reflection coefficient is adjusted to the target reflection coefficient. The pilot signals transmitted by the transmitting device include the target pilot signal.

Through the present disclosure, control information is determined by a receiving device, wherein the control information includes temporal information and control direction information; the control direction information is used for instructing a meta-surface control unit to adjust a reflection coefficient of a meta-surface to a target reflection coefficient corresponding to a preset direction, so that a beam in a direction from the receiving device to the meta-surface forms on the meta-surface a reflected beam in the preset direction: the preset direction is a direction indicated by preset direction information corresponding to a target time period, and the preset direction points to a target area: the temporal information includes the target time period; and the control direction information includes the preset direction information. A pilot signal is transmitted to the meta-surface by a transmitting device, wherein the transmitting device is located in the target area. The control information is sent to the meta-surface control unit by the receiving device, wherein the control information is used for instructing the meta-surface control unit to adjust the reflection coefficient of the meta-surface to the target reflection coefficient corresponding to the preset direction within the target time period. A signal measurement result corresponding to the preset direction is determined, and the transmitting device is positioned according to the preset direction and the signal measurement result, wherein the signal measurement result is a measurement result obtained by the receiving device measuring a received target pilot signal: the target pilot signal is received by the receiving device after reflected by the meta-surface whose reflection coefficient is adjusted to the target reflection coefficient; and the pilot signals transmitted by the transmitting device include the target pilot signal. Therefore, the technical problem in the related art that a terminal cannot be positioned by means of characteristics of a meta-surface can be solved, thereby achieving the effect of using the characteristics of a meta-surface to position a terminal.

It is to be noted that the positioning node may be the receiving device or other positioning devices in the network.

In an exemplary embodiment, the receiving device is further configured to determine the control information according to the target area. The receiving device is configured to determine the control information in a following manner. Multiple pieces of preset direction information are determined according to multiple sub-areas obtained by dividing the target area, and multiple target time periods are determined according to the multiple pieces of preset direction information. The multiple pieces of preset direction information are in one-to-one correspondence with the multiple sub-areas. The temporal information includes the multiple target time periods. The multiple target time periods are in one-to-one correspondence with the multiple pieces of preset direction information. Alternatively, multiple preset directions pointing to the target area are determined, each piece of preset direction information among multiple pieces of preset direction information is determined as a respective one of the multiple preset directions, and multiple target time periods are determined according to the multiple pieces of preset direction information. The temporal information includes the multiple target time periods, and the multiple target time periods are in one-to-one correspondence with the multiple pieces of preset direction information.

In an exemplary embodiment, the meta-surface control unit is configured to: determine the target reflection coefficient by according to the preset direction information; and adjust a reflection coefficient of each electromagnetic unit of the meta-surface to the target reflection coefficient within the target time period, so as to adjust the reflection coefficient of the meta-surface to the target reflection coefficient. The reflection coefficient of each electromagnetic unit includes at least one of amplitude, phase and polarization.

In an exemplary embodiment, the receiving device is further configured to: determine the target time period corresponding to each signal measurement result in the signal measurement result set, wherein the signal measurement result set includes the signal measurement result corresponding to the preset direction; and according to the target time period, determine the preset direction indicated by the preset direction information corresponding to the target time period, and determine the signal measurement result corresponding to the target time period as the signal measurement result corresponding to the preset direction.

In an exemplary embodiment, the positioning node is further configured to: according to the preset direction and a position and height of the meta-surface, determine position coordinates ($x_i$, $y_i$) of the reflected beam corresponding to each preset direction in the target area, and determine a value of the signal measurement result corresponding to the preset direction as a z-coordinate $z_i$ corresponding to the position coordinates ($x_i$, $y_i$), wherein i is an identifier of the reflected beam corresponding to the preset direction: perform the Gaussian function fitting according to a coordinate range of the target area, the position coordinates ($x_i$, $y_i$) and the corresponding z-coordinate $z_i$ to obtain the fitted Gaussian function, and determine the positioning result of positioning the transmitting device according to coordinates corresponding to a vertex of the fitted Gaussian function.

In an exemplary embodiment, the positioning node is further configured to: sample the x-coordinate range and the y-coordinate range of the target area respectively according to the preset coordinate interval to obtain the sampled x-coordinate set and y-coordinate set: determine a z-coordinate $z_w$ corresponding to each x-coordinate $x_w$ in the x-coordinate set from the z-coordinate $z_i$ corresponding to the position coordinates ($x_i$, $v_i$), and determine a z-coordinate $z_p$ corresponding to each y-coordinate $y_p$ in the y-coordinate set from the z-coordinate $z_i$ corresponding to the position coordinates ($x_i$, $v_i$), wherein both w and p are positive integers in an interval [1, n], and n is the number of samples sampled: perform the one-dimensional Gaussian function fitting according to a coordinate set ($x_w$; $z_w$) composed of the x-coordinate set and the z-coordinate $z_w$ corresponding to each x-coordinate $x_w$ in the x-coordinate set to obtain the fitted first Gaussian function, and perform the one-dimensional Gaussian function fitting according to a coordinate set ($y_p$, $z_p$) composed of the y-coordinate set and the z-coordinate $z_p$ corresponding to each y-coordinate $y_p$ in the y-coordinate set to obtain the fitted second Gaussian function; determine the first coordinate $x_t$ corresponding to the vertex of the first Gaussian function and the second coordinate $y_t$ corresponding to the vertex of the second Gaussian function, and determine $x_t$ and $y_t$ respectively as an x-coordinate and a y-coordinate of the positioning result, $x_t$ being an x-coordinate within the x-coordinate range, and $y_t$ being a y-coordinate within the y-coordinate range.

In an exemplary embodiment, the positioning node is further configured to: according to the preset direction and a position and height of the meta-surface, determine position coordinates ($x_i$, $y_i$) of the reflected beam corresponding to each preset direction in the target area, and determine a value of the signal measurement result corresponding to the preset direction as a z-coordinate $z_i$ corresponding to the position coordinates ($x_i$, $y_i$), wherein i is an identifier of the reflected beam corresponding to the preset direction: fit the two-dimensional Gaussian function according to a coordinate set ($x_i$, $y_i$, $z_i$) composed of the position coordinates ($x_i$, $y_i$) and the z-coordinate $z_i$ to obtain the fitted two-dimensional Gaussian function: determine coordinates ($x_t$, $y_t$) corresponding to a vertex of the two-dimensional Gaussian function, and determine the coordinates ($x_t$, $y_t$) as a positioning result of positioning the transmitting device, $x_t$ being an x-coordinate within the x-coordinate range of the target area and $y_t$ being a y-coordinate within the y-coordinate range of the target area.

In an exemplary embodiment, the positioning node is further configured to: determine the target direction information according to a positioning result of positioning the transmitting device, the target direction information being used for instructing the meta-surface control unit to control a reflection coefficient of each electromagnetic unit of the meta-surface according to the target direction information, so that the reflected beam formed on the meta-surface by the radio signal transmitted by the receiving device points to the transmitting device.

In an exemplary embodiment, when the preset direction information is the input parameter corresponding to the preset direction, after the control information is sent to the meta-surface control unit by the receiving device, the method may further include the following operations: the target reflection coefficient is determined by the meta-surface control unit according to the input parameter; and a reflection coefficient of each electromagnetic unit of the meta-surface is adjusted to the target reflection coefficient by the meta-surface control unit within the target time period, so as to adjust the reflection coefficient of the meta-surface to the target reflection coefficient: or, in a case where the preset direction information is the target reflection coefficient corresponding to the preset direction, after the control information is sent to the meta-surface control unit by the receiving device, the method may further include the following operation: a reflection coefficient of each electromagnetic unit of the meta-surface is adjusted to the target reflection coefficient by the meta-surface control unit within the target time period, so as to adjust the reflection coefficient of the meta-surface to the target reflection coefficient.

In an exemplary embodiment, the control information may further include at least one of following information: the time of starting the adjustment and control of the beam, which is used for instructing the meta-surface control unit to start controlling a reflection coefficient of each electromagnetic unit of the meta-surface at the time of starting the adjustment and control of the beam; and the time of ending the adjustment and control of the beam, which is used for instructing the meta-surface control unit to end up controlling the reflection coefficient of each electromagnetic unit of the meta-surface at the time of ending the adjustment and control of the beam.

It is to be noted that, each of the above modules may be realized by software or hardware. For the latter, the each of the above modules may be realized by, but not limited to, the following way: all of the above modules are in the same processor: or, the above modules are respectively in different processors in form of any combination.

An embodiment of the present disclosure also provides a computer-readable storage medium, in which a computer program is stored. The computer program is configured to perform, when running, the operations in any of the above method embodiments.

In an exemplary embodiment, the computer-readable storage media may include, but are not limited to, a USB flash disk, an ROM, an RAM, a mobile hard disk, a magnetic disk, a compact disc, and other media capable of storing the computer program.

An embodiment of the present disclosure also provides an electronic device, which includes a memory and a processor. The memory stores a computer program. The processor is configured to run the computer program, so as to execute the operations in any of the above method embodiments.

In an exemplary embodiment, the electronic device may also include a transceiver device and an input/output device. The transceiver device is connected with the processor, and the input/output device is connected with the processor.

The specific examples in the present embodiment may refer to the examples described in the above embodiments and exemplary embodiments, and will not be repeated here.

It is apparent that those having ordinary skill in the art should appreciate that the above modules and operations of the present disclosure may be implemented by a general-purpose computing device, and they may be centralized in a single computing device or distributed on a network composed of multiple computing devices: they may be implemented by a program code which is capable of being executed by the computing device, so that they may be stored in a storage device and executed by the computing device; and in some situations, the presented or described operations may be executed in an order different from that described here; or they are made into integrated circuit modules, respectively; or multiple modules and operations of them are made into a single integrated circuit module to realize. Therefore, the present disclosure is not limited to any particular combination of hardware and software.

The above is only the exemplary embodiments of the present disclosure and not intended to limit the present disclosure; for those having ordinary skill in the art, the present disclosure may have various modifications and changes. Any modifications, equivalent replacements, improvements and the like within the principle of the present disclosure should fall within the protection scope of the claims of the present disclosure.

What is claimed is:

1. A positioning method for a transmitting device, comprising:

determining control information by a receiving device, wherein the control information comprises temporal information and control direction information; the control direction information is used for instructing a meta-surface control unit to adjust a reflection coefficient of a meta-surface to a target reflection coefficient corresponding to a preset direction, so that a beam in a direction from the receiving device to the meta-surface forms on the meta-surface a reflected beam in the preset direction: the preset direction is a direction indicated by preset direction information corresponding to a target time period, and the preset direction points to a target area: the temporal information comprises the target time period; and the control direction information comprises the preset direction information;

transmitting a pilot signal to the meta-surface by a transmitting device, wherein the transmitting device is located in the target area;

sending the control information to the meta-surface control unit by the receiving device, wherein the control information is used for instructing the meta-surface control unit to adjust the reflection coefficient of the meta-surface to the target reflection coefficient corresponding to the preset direction within the target time period; and determining a signal measurement result corresponding to the preset direction, and positioning the transmitting device according to the preset direction and the signal measurement result, wherein the signal measurement result is a measurement result obtained by the receiving device measuring a received target pilot signal: the target pilot signal is received by the receiving device after reflected by the meta-surface whose reflection coefficient is adjusted to the target reflection coefficient; and the pilot signal transmitted by the transmitting device comprises the target pilot signal.

2. The method according to claim 1, wherein determining the control information by the receiving device comprises determining the control information according to a target area;
determining the control information according to the target area comprises:
determining multiple pieces of preset direction information according to multiple sub-areas obtained by dividing the target area, and determining multiple target time periods according to the multiple pieces of preset direction information, wherein the multiple pieces of preset direction information are in one-to-one correspondence with the multiple sub-areas, the temporal information comprises the multiple target time periods, and the multiple target time periods are in one-to-one correspondence with the multiple pieces of preset direction information: or, determining multiple preset directions pointing to the target area, determining each piece of preset direction information among multiple pieces of preset direction information as a respective one of the multiple preset directions, and determining multiple target time periods according to the multiple pieces of preset direction information, wherein the temporal information comprises the multiple target time periods, and the multiple target time periods are in one-to-one correspondence with the multiple pieces of preset direction information.

3. The method according to claim 1, wherein after sending the control information to the meta-surface control unit by the receiving device, the method further comprises:
determining the target reflection coefficient by the meta-surface control unit according to the preset direction information; and
adjusting a reflection coefficient of each electromagnetic unit of the meta-surface to the target reflection coefficient by the meta-surface control unit within the target time period, so as to adjust the reflection coefficient of the meta-surface to the target reflection coefficient;
wherein the reflection coefficient of each electromagnetic unit comprises at least one of amplitude, phase and polarization.

4. The method according to claim 1, wherein in a case where the preset direction information is an input parameter corresponding to the preset direction, after sending the control information to the meta-surface control unit by the receiving device, the method further comprises:
determining the target reflection coefficient by the meta-surface control unit according to the input parameter; and
adjusting a reflection coefficient of each electromagnetic unit of the meta-surface to the target reflection coefficient by the meta-surface control unit within the target time period, so as to adjust the reflection coefficient of the meta-surface to the target reflection coefficient; or
in a case where the preset direction information is the target reflection coefficient corresponding to the preset direction, after sending the control information to the meta-surface control unit by the receiving device, the method further comprises:
adjusting a reflection coefficient of each electromagnetic unit of the meta-surface to the target reflection coefficient by the meta-surface control unit within the target time period, so as to adjust the reflection coefficient of the meta-surface to the target reflection coefficient.

5. The method according to claim 1, wherein the control information further comprises at least one of following information:
beam control start time for instructing the meta-surface control unit to start controlling a reflection coefficient of each electromagnetic unit of the meta-surface at the beam control start time; and
beam control end time for instructing the meta-surface control unit to end up controlling the reflection coefficient of each electromagnetic unit of the meta-surface at the beam control end time.

6. The method according to claim 1, wherein determining the signal measurement result corresponding to the preset direction comprises:
determining the target time period corresponding to each signal measurement result in a signal measurement result set, wherein the signal measurement result set comprises the signal measurement result corresponding to the preset direction; and
according to the target time period, determining the preset direction indicated by the preset direction information corresponding to the target time period, and determining the signal measurement result corresponding to the target time period as the signal measurement result corresponding to the preset direction.

7. The method according to claim 1, wherein positioning the transmitting device according to the preset direction and the signal measurement result comprises:
according to the preset direction and a position and height of the meta-surface, determining position coordinates ($x_i$, $y_i$) of the reflected beam corresponding to each preset direction in the target area, and determining a value of the signal measurement result corresponding to the preset direction as a z-coordinate $z_i$ corresponding to the position coordinates ($x_i$, $y_i$), wherein i is an identifier of the reflected beam corresponding to the preset direction; and
performing Gaussian function fitting according to a coordinate range of the target area, the position coordinates ($x_i$, $y_i$) and the corresponding z-coordinate $z_i$ to obtain a fitted Gaussian function, and determining a positioning result of positioning the transmitting device according to coordinates corresponding to a vertex of the fitted Gaussian function.

8. The method according to claim 7, wherein performing Gaussian function fitting according to the coordinate range of the target area, the position coordinates ($x_i$, $y_i$) and the corresponding z-coordinate $z_i$ to obtain the fitted Gaussian function, and determining the positioning result of positioning the transmitting device according to the coordinates corresponding to the vertex of the fitted Gaussian function comprises:
sampling an x-coordinate range and a y-coordinate range of the target area respectively according to a preset coordinate interval to obtain an x-coordinate set and a y-coordinate set after sampling;
determining a z-coordinate $z_w$ corresponding to each x-coordinate $x_w$ in the x-coordinate set from the z-coordinate $z_i$ corresponding to the position coordinates ($x_i$, $y_i$), and determining a z-coordinate $z_p$ corresponding to each y-coordinate $y_p$ in the y-coordinate set from the z-coordinate $z_i$ corresponding to the position coordinates ($x_i$, $y_i$), wherein both the w and p are positive integers in an interval [1, n], and n is the number of samples sampled;
performing one-dimensional Gaussian function fitting according to a coordinate set ($x_w$; $z_w$) composed of the x-coordinate set and the z-coordinate zw corresponding to each x-coordinate xw in the x-coordinate set to obtain a fitted first Gaussian function; and performing one-dimensional Gaussian function fitting according to a coordinate set (yp, zp) composed of the y-coordinate set and the z-coordinate zp corresponding to each y-coordinate yp in the y-coordinate set to obtain a fitted second Gaussian function; and determining a first coordinate xt corresponding to a vertex of the first Gaussian function and a second coordinate yt corresponding to a vertex of the second Gaussian function, and determining xt and yt respectively as an x-coordinate and a y-coordinate of the positioning result, wherein xt is an x-coordinate within the x-coordinate range, and yt is a y-coordinate within the y-coordinate range.

9. The method according to claim 1, wherein positioning the transmitting device according to the preset direction and the signal measurement result comprises:

according to the preset direction and a position and height of the meta-surface, determining position coordinates (xi, yi) of the reflected beam corresponding to each preset direction in the target area, and determining a value of the signal measurement result corresponding to the preset direction as a z-coordinate zi corresponding to the position coordinates (xi, yi), wherein i is an identifier of the reflected beam corresponding to the preset direction;

performing two-dimensional Gaussian function fitting according to a coordinate set (xi, yi, zi) composed of the position coordinates (xi, yi) and the z-coordinate zi to obtain a fitted two-dimensional Gaussian function; and determining coordinates (xt, yt) corresponding to a vertex of the two-dimensional Gaussian function, and determining the coordinates (xt, yt) as a positioning result of positioning the transmitting device, wherein xt is an x-coordinate within an x-coordinate range of the target area, and yt is a y-coordinate within a y-coordinate range of the target area.

10. The method according to claim 1, wherein after determining the signal measurement result corresponding to the preset direction, and positioning the transmitting device according to the preset direction and the signal measurement result, the method further comprises:

determining target direction information according to a positioning result of positioning the transmitting device, wherein the target direction information is used for instructing the meta-surface control unit to control a reflection coefficient of each electromagnetic unit of the meta-surface according to the target direction information, so that the reflected beam formed on the meta-surface by a radio signal transmitted by the receiving device points to the transmitting device.

11. A positioning device for a transmitting device, comprising a memory storing instructions and a processor in communication with the memory, wherein the processor is configured to execute the instructions to:

determine control information by a receiving device, wherein the control information comprises temporal information and control direction information; the control direction information is used for instructing a meta-surface control unit to adjust a reflection coefficient of a meta-surface to a target reflection coefficient corresponding to a preset direction, so that a beam in a direction from the receiving device to the meta-surface forms on the meta-surface a reflected beam in the preset direction; the preset direction is a direction indicated by preset direction information corresponding to a target time period, and the preset direction points to a target area: the temporal information comprises the target time period; and the control direction information comprises the preset direction information;

transmit a pilot signal to the meta-surface by a transmitting device, wherein the transmitting device is located in the target area;

send the control information to the meta-surface control unit by the receiving device, wherein the control information is used for instructing the meta-surface control unit to adjust the reflection coefficient of the meta-surface to the target reflection coefficient corresponding to the preset direction within the target time period; and determine a signal measurement result corresponding to the preset direction, and position the transmitting device according to the preset direction and the signal measurement result, wherein the signal measurement result is a measurement result obtained by the receiving device measuring a received target pilot signal; the target pilot signal is received by the receiving device after reflected by the meta-surface whose reflection coefficient is adjusted to the target reflection coefficient; and the pilot signal transmitted by the transmitting device comprises the target pilot signal.

12. A positioning system for a transmitting device, comprising: a transmitting device, a receiving device, a meta-surface control unit, a meta-surface and a positioning node;

the receiving device is configured to determine control information, wherein the control information comprises temporal information and control direction information; the control direction information is used for instructing a meta-surface control unit to adjust a reflection coefficient of a meta-surface to a target reflection coefficient corresponding to a preset direction, so that a beam in a direction from the receiving device to the meta-surface forms on the meta-surface a reflected beam in the preset direction; the preset direction is a direction indicated by preset direction information corresponding to a target time period, and the preset direction points to a target area; the temporal information comprises the target time period; and the control direction information comprises the preset direction information;

the transmitting device is configured to transmit a pilot signal to the meta-surface, wherein the transmitting device is located in the target area;

the receiving device is further configured to send the control information to the meta-surface control unit, wherein the control information is used for instructing the meta-surface control unit to adjust the reflection coefficient of the meta-surface to the target reflection coefficient corresponding to the preset direction within the target time period;

the receiving device is further configured to determine a signal measurement result corresponding to the preset direction; and the positioning node is configured to position the transmitting device according to the preset direction and the signal measurement result, wherein the signal measurement result is a measurement result obtained by the receiving device measuring a received target pilot signal; the target pilot signal is received by the receiving device after reflected by the meta-surface whose reflection coefficient is adjusted to the target reflection coefficient; and the pilot signal transmitted by the transmitting device comprises the target pilot signal.

13. The system according to claim 12, wherein the receiving device is further configured to determine the control information according to a target area;

the receiving device is configured to determine the control information in a following manner:

determining multiple pieces of preset direction information according to multiple sub-areas obtained by dividing the target area, and determining multiple target time periods according to the multiple pieces of preset direction information, wherein the multiple pieces of preset direction information are in one-to-one correspondence with the multiple sub-areas, the temporal information comprises the multiple target time periods, and the multiple target time periods are in one-to-one correspondence with the multiple pieces of preset direction information; or, determining multiple preset directions pointing to the target area, and determining each piece of preset direction information among multiple pieces of preset direction information as a respective one of the multiple preset directions, and determining multiple target time periods according to the multiple pieces of preset direction information, wherein the temporal information comprises the multiple target time periods, and the multiple target time periods are in one-to-one correspondence with the multiple pieces of preset direction information.

14. The system according to claim 12, wherein the meta-surface control unit is configured to:

determine the target reflection coefficient according to the preset direction information; and adjust a reflection coefficient of each electromagnetic unit of the meta-surface to the target reflection coefficient within the target time period, so as to adjust the reflection coefficient of the meta-surface to the target reflection coefficient;

wherein the reflection coefficient of each electromagnetic unit comprises at least one of amplitude, phase and polarization.

15. The system according to claim 12, wherein the receiving device is further configured to:

determine the target time period corresponding to each signal measurement result in a signal measurement result set, wherein the signal measurement result set comprises the signal measurement result corresponding to the preset direction; and according to the target time period, determine the preset direction indicated by the preset direction information corresponding to the target time period, and determine the signal measurement result corresponding to the target time period as the signal measurement result corresponding to the preset direction.

16. The system according to claim 12, wherein the positioning node is further configured to:

according to the preset direction and a position and height of the meta-surface, determine position coordinates (xi, yi) of the reflected beam corresponding to each preset direction in the target area, and determine a value of the signal measurement result corresponding to the preset direction as a z-coordinate zi corresponding to the position coordinates (xi, yi), wherein i is an identifier of the reflected beam corresponding to the preset direction; and perform Gaussian function fitting according to a coordinate range of the target area, the position coordinates (xi, yi) and the corresponding z-coordinate zi to obtain a fitted Gaussian function, and determine a positioning result of positioning the transmitting device according to coordinates corresponding to a vertex of the fitted Gaussian function.

17. The system according to claim 16, wherein the positioning node is further configured to:

sample an x-coordinate range and a y-coordinate range of the target area respectively according to a preset coordinate interval to obtain an x-coordinate set and a y-coordinate set after sampling;

determine a z-coordinate zw corresponding to each x-coordinate xw in the x-coordinate set from the z-coordinate zi corresponding to the position coordinates (xi, yi), and determine a z-coordinate zp corresponding to each y-coordinate yp in the y-coordinate set from the z-coordinate zi corresponding to the position coordinates (xi, yi), wherein both the w and p are positive integers in an interval [1, n], and n is the number of samples sampled;

perform one-dimensional Gaussian function fitting according to a coordinate set (xw, zw) composed of the x-coordinate set and the z-coordinate zw corresponding to each x-coordinate xw in the x-coordinate set to obtain a fitted first Gaussian function; and perform one-dimensional Gaussian function fitting according to a coordinate set (vp, zp) composed of the y-coordinate set and the z-coordinate zp corresponding to each y-coordinate yp in the y-coordinate set to obtain a fitted second Gaussian function;

determine a first coordinate xt corresponding to a vertex of the first Gaussian function and a second coordinate yt corresponding to a vertex of the second Gaussian function, and determine xt and yt respectively as an x-coordinate and a y-coordinate of the positioning result, wherein xt is an x-coordinate within the x-coordinate range, and yt is a y-coordinate within the y-coordinate range.

18. The system according to claim 12, wherein the positioning node is further configured to:

according to the preset direction and a position and height of the meta-surface, determine position coordinates (xi, yi) of the reflected beam corresponding to each preset direction in the target area, and determine a value of the signal measurement result corresponding to the preset direction as a z-coordinate zi corresponding to the position coordinates (xi, yi), wherein i is an identifier of the reflected beam corresponding to the preset direction;

perform two-dimensional Gaussian function fitting according to a coordinate set (xi, yi, zi) composed of the position coordinates (xi, yi) and the z-coordinate zi to obtain a fitted two-dimensional Gaussian function; and determine coordinates (xt, yt) corresponding to a vertex of the two-dimensional Gaussian function, and determine the coordinates (xt, yt) as a positioning result of positioning the transmitting device, wherein xt is an x-coordinate within the x-coordinate range of the target area, and yt is a y-coordinate within the y-coordinate range of the target area.

19. A non-transitory computer-readable storage medium, in which a computer program is stored, wherein the computer program is configured to execute, when running, the method according to claim 1.

20. An electronic device, comprising a memory and a processor, wherein the memory stores a computer program, and the processor is configured to run the computer program, so as to perform the method according to claim 1.

* * * * *